United States Patent
Nagata et al.

(10) Patent No.: US 7,127,325 B2
(45) Date of Patent: Oct. 24, 2006

(54) CONTROLLABLE OBJECT REMOTE CONTROL AND DIAGNOSIS APPARATUS

(75) Inventors: Hideo Nagata, Fukuoka (JP); Yasuyuki Inoue, Fukuoka (JP); Ken'ichi Yasuda, Fukuoka (JP); Hiroyuki Handa, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 164 days.

(21) Appl. No.: 10/472,942

(22) PCT Filed: Mar. 26, 2002

(86) PCT No.: PCT/JP02/02886

§ 371 (c)(1),
(2), (4) Date: Sep. 26, 2003

(87) PCT Pub. No.: WO02/077735

PCT Pub. Date: Oct. 3, 2002

(65) Prior Publication Data
US 2004/0083010 A1  Apr. 29, 2004

(30) Foreign Application Priority Data
Mar. 27, 2001  (JP) ............................. P.2001-90531

(51) Int. Cl.
*G06F 19/00* (2006.01)
(52) U.S. Cl. ....................... 700/245; 700/257; 700/258; 340/7.35; 340/7.45; 340/7.55; 340/7.57; 370/314; 370/349; 370/411; 901/27
(58) Field of Classification Search ................ 700/245, 700/257, 258; 340/7.35, 7.45, 7.55, 7.57; 370/314, 349, 411; 606/1, 130; 713/151, 713/176, 201; 718/102; 901/27
See application file for complete search history.

(56) References Cited

U.S. PATENT DOCUMENTS

| 5,656,906 | A |   | 8/1997  | Iwashita et al. |
|-----------|---|---|---------|-----------------|
| 5,762,458 | A | * | 6/1998  | Wang et al. ................... 414/1 |
| 5,978,578 | A |   | 11/1999 | Azarya et al. |
| 6,804,580 | B1 | * | 10/2004 | Stoddard et al. ............ 700/248 |
| 6,892,112 | B1 | * | 5/2005  | Wang et al. ................. 700/258 |
| 2003/0195664 | A1 | * | 10/2003 | Nowlin et al. .............. 700/260 |

FOREIGN PATENT DOCUMENTS

| EP | 0387359 A1 | 9/1990 |
| JP | 5-35751 A  | 2/1993 |

(Continued)

OTHER PUBLICATIONS

Yuji Watabe et al., "Mitsubishi Denki ni okeru CNC Open-ka no Torikumi", Kikaigijutsu, The Nikkan Kogyo Shinbum, Ltd., Nov. 1, 2000, vol. 48, No. 12, pp. 48 to 54.

(Continued)

*Primary Examiner*—Thomas G. Black
*Assistant Examiner*—McDieunel Marc
(74) *Attorney, Agent, or Firm*—Sughrue Mion, PLLC

(57) ABSTRACT

A robot apparatus having a robot and a controller for controlling the robot. The apparatus has a diagnosing computer connected to the controller and acquiring a state quantity of the robot. An analyzing computer is provided remotely from the robot and has a control parameter adjuster for adjusting a control parameter of the robot, and a communicating function of connecting the computers. The state quantity is transmitted to the analyzing computer by the communicating function and a control parameter of the robot is obtained based on the state quantity. The control parameter is transmitted to the controller through the diagnosing computer to control the robot.

13 Claims, 11 Drawing Sheets

FOREIGN PATENT DOCUMENTS

| | | |
|---|---|---|
| JP | 6-110539 A | 4/1994 |
| JP | 6-335884 A | 12/1994 |
| JP | 7-160323 A | 6/1995 |
| JP | 8-221132 A | 8/1996 |
| JP | 10-211575 A | 8/1998 |
| WO | WO 00/62138 A1 | 10/2000 |

OTHER PUBLICATIONS

Naoyuki Kani, "Gazo Sohoko Tsushin o Mochita Enkaku Seigyo/Hoshu no Shinten Hoko", Keiso, Kogyo Gijutsusha, Feb. 1, 1996, vol. 39, No. 2, pp. 10 to 13.

* cited by examiner

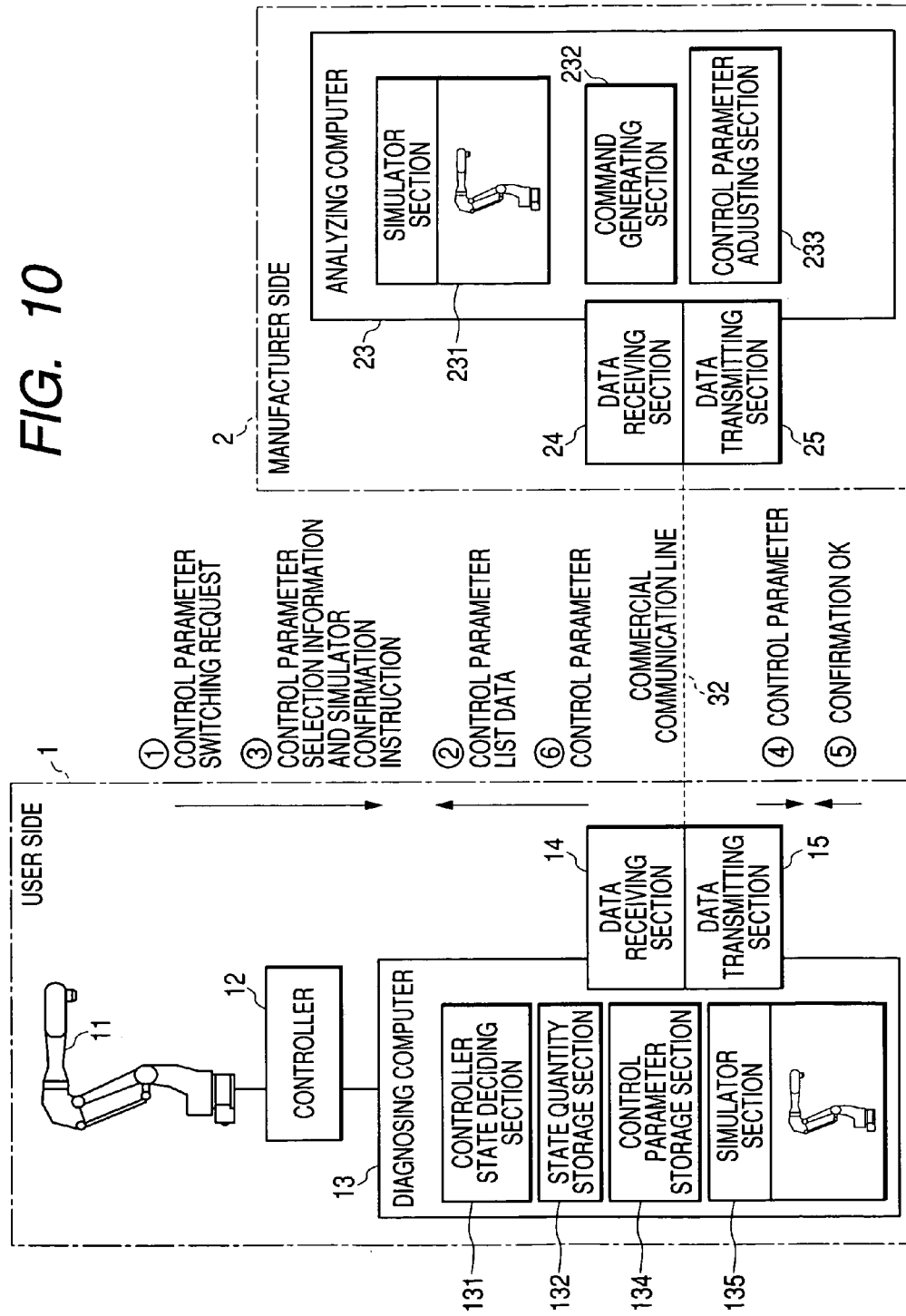

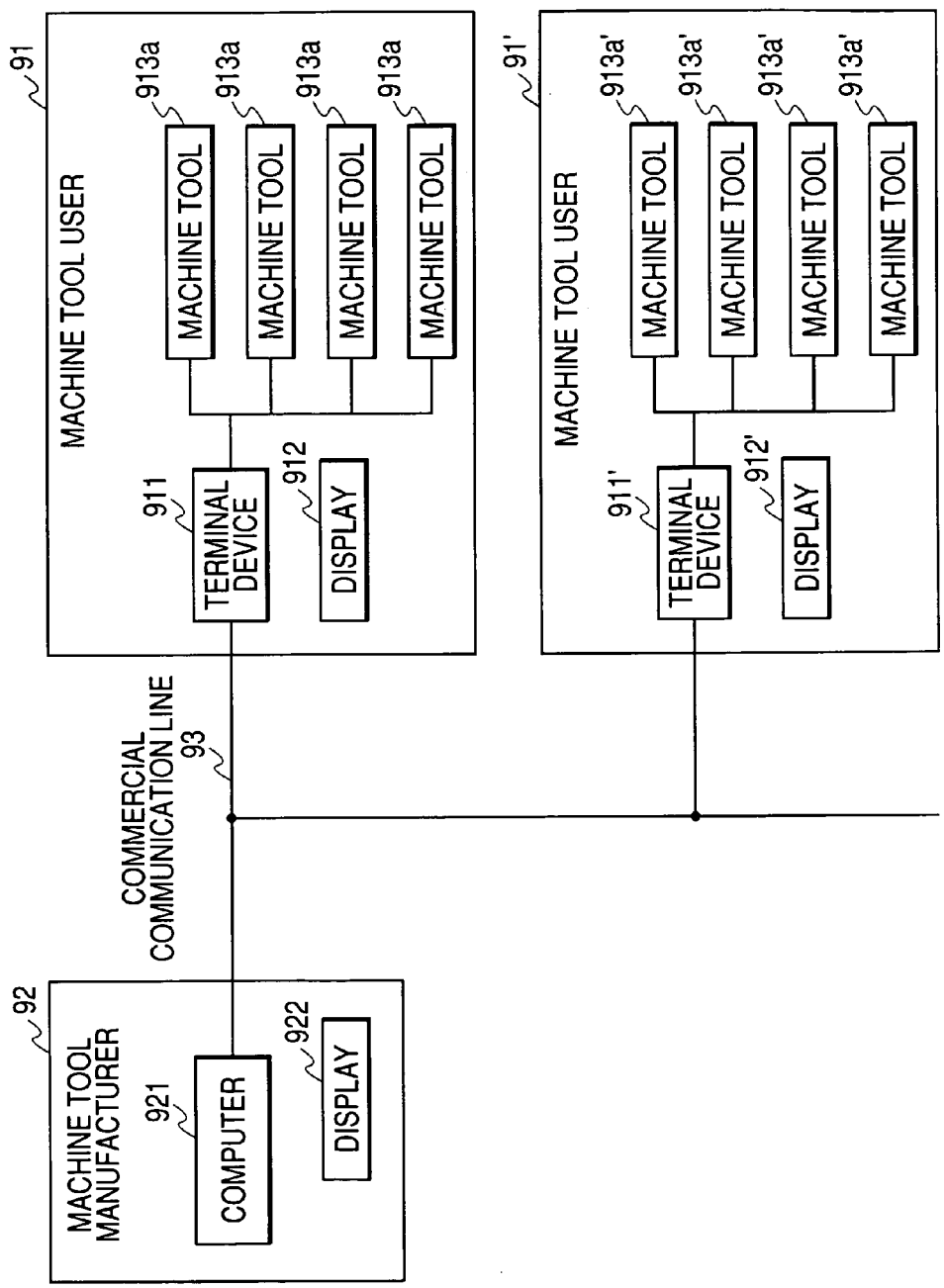

CONTROLLABLE OBJECT REMOTE CONTROL AND DIAGNOSIS APPARATUS

TECHNICAL FIELD

The present invention relates to a remote adjusting and diagnosing apparatus for carrying out the adjustment, maintenance and diagnosis of a control object such as a robot, a servo motor or an NC device which is provided in a remote place.

BACKGROUND ART

In some cases in which the maintenance, diagnosis and adjustment of a control object including a motor such as a robot, a servo motor or an NC device in the factory of a user in a remote place is to be carried out, conventionally, an operator on the user side cannot fully take measures. For example, it is necessary to newly adjust a servo gain at such a degree that a different load is applied to the control object in some cases. Since the control object oscillates depending on an adjusting method. The operator on the user side that does not have the know-how of the adjustment carries a risk in some cases. For this reason, an operator on the manufacturer side or an operator in a service center on the manufacturer side which is placed close to the factory of the user is to go to a spot so that a time, a labor and a cost are taken.

Also in the case in which the control object is to be suddenly adjusted, moreover, a time is taken for the operator of the manufacturer to go to a remote place. Consequently, a time loss is generated. Also in the case in which the operator on the manufacturer side is to carry out the maintenance, diagnosis and adjustment on the spot, furthermore, the line of a factory including the control object is to be stopped. Consequently, a productivity is also influenced. Also in the case in which a large-sized measuring device is brought onto the line of the factory, similarly, the line is to be stopped. In some cases, thus, it is hard to bring the measuring device on a physically narrow line.

Referring to such a problem, for example, JP-A-5-35751 has disclosed the conventional art in which a management computer owned by a manufacturer and a machine tool or a terminal device thereof which is owned by a user are connected to each other through a commercial communication line, thereby carrying out the periodic diagnosis, failure diagnosis and failure repair of the machine tool in dialogue as shown in FIG. 11.

In the conventional art, when a request for a periodic diagnosis or a request for a failure diagnosis of a machine tool 913a is given from a machine tool user 91, a program for the periodic diagnosis or the failure diagnosis is transmitted from a management computer 921 including a program for the periodic diagnosis or the failure diagnosis owned by a machine tool manufacturer 92 to the machine tool 913a or a terminal device 911 thereof through a commercial communication line 93.

Information required for the periodic diagnosis or the failure diagnosis which is generated as a result of the execution of the program in the machine tool 913a is fed back to the management computer 921 through the commercial communication line 93 again. The management computer 921 executes a special analysis program based on the information, thereby automatically analyzing the periodic diagnosis or failure diagnosis program of the machine tool 913a and transmitting the result of the analysis through the commercial communication line 93 to the machine tool 913a or the terminal device thereof which is owned by the user.

Moreover, display devices 912 and 922 of the programs for the periodic diagnosis and failure diagnosis are provided on the machine tool 913a or the terminal device thereof which is owned by the user 91 and the management computer 921 owned by the manufacturer 92, and information required for the periodic diagnosis, the failure diagnosis and the failure repair are transmitted in dialogue through the display devices 912 and 922.

For a method of diagnosing the operating waveform of an industrial robot, furthermore, JP-A-7-160323 has disclosed the conventional art in which the waveform of the operation data of a robot is stored and is compared with a reference waveform to extract a feature amount. In the conventional art, to a robot controller is connected a workstation having a data file for storing the history of the operation data of a robot body in communication with the controller of the robot, a waveform feature extracting section for extracting the feature amount of the waveform of the operation data fetched in comparison with a reference waveform, a standard data creating section for creating standard data modeled from the reference waveform and the feature amount, a standard data adjusting section for adjusting the standard data corresponding to the operation data, and a waveform diagnosing section for diagnosing the waveform of the operation data while looking up a preset comment table for a waveform diagnosis in comparison of the adjusted standard data with the operation data.

However, the invention described in the JP-A-5-35751 mainly relates to a periodic diagnosis or a failure diagnosis for a machine tool to be a control object in a remote place and does not correspond to the adjustment of the control parameter of the control object present in the remote place such as the servo gain of the control object or an inherent parameter in an application.

Moreover, there is a problem in that the line of a factory is to be stopped also when the periodic diagnosis or the failure diagnosis is to be carried out or a large-sized measuring device is to be brought in.

Furthermore, an operator on the user side is to take a countermeasure in a dialogue form. In the case in which the operator is not present, therefore, a countermeasure cannot be taken and a time loss is generated so that any processing cannot be carried out during the play-back operation of the control object and the periodic diagnosis and the failure diagnosis cannot be performed automatically.

In addition, in the invention described in the JP-A-7-160323, the feature amount is extracted from the operation data of the robot in comparison with the reference waveform and the comment table for a waveform diagnosis is looked up. The extraction of the operation data and the automatic decision of the waveform thereof are simply carried out. In the same manner as in the conventional art, therefore, it is impossible to obtain such a structure that the result is reflected on the adjustment of the gain of the robot and the adjustment of the inherent parameter in the application so that the operation can be confirmed.

Moreover, the waveform of the operation data can be fetched by only a predetermined operation. For this reason, it is impossible to carry out the periodic diagnosis and the failure diagnosis during the play-back operation to be performed based on a work program created by an operator on the user side.

DISCLOSURE OF THE INVENTION

Therefore, it is an object of the invention to provide a remote adjusting and diagnosing apparatus capable of easily carrying out the adjustment of a servo gain of a control object and an inherent adjustment in an application through an analyzing computer provided in a remote place, coping with the request of the adjustment given from a user without a time loss, performing an adjustment required for a large-sized measuring device and executing a failure diagnosis during a normal play-back operation without stopping the line of a factory.

In order to solve the problems, a first aspect of the invention is directed to a remote adjusting and diagnosing apparatus for a control object comprising a control object and a controller for controlling the control object, wherein the apparatus has a diagnosing computer connected to the controller and acquiring a state quantity of the control object, an analyzing computer provided remotely from the control object and having means for adjusting a control parameter of the control object, a communicating function of connecting the computers, and means for transmitting the state quantity to the analyzing computer by the communicating function and obtaining the control parameter of the control object based on the state quantity, and transmitting the control parameter to the controller through the diagnosing computer to control the control object.

A second aspect of the invention is directed to the remote adjusting and diagnosing apparatus for a control object, wherein the analyzing computer has a command generating section for creating an operation command for a control parameter adjustment of the control object, a data transmitting section for transmitting the operation command to the diagnosing computer, a data receiving section for receiving a state quantity of the control object from the diagnosing computer, a simulator section for reproducing an operation and a state by using a model of the control object from the state quantity of the control object in accordance with the operation command, and a control parameter adjusting section for adjusting a control parameter from a result obtained by the simulator section.

A third aspect of the invention is directed to the remote adjusting and diagnosing apparatus for a control object, wherein the diagnosing computer has a state quantity storage section for storing the state quantity of the control object, a controller state deciding section for deciding a state of the controller, a data receiving section for receiving an operation command for a control parameter adjustment sent from the analyzing computer, and a data transmitting section for transmitting the state quantity of the control object to the analyzing computer.

According to the remote adjusting and diagnosing apparatus for a control object according to the first to third aspects of the invention, thus, the adjustment to be carried out by an operator on a manufacturer side going to a factory on a user side can easily be performed through the analyzing computer on the manufacturer side. Moreover, it is possible to immediately take a countermeasure in response to a request for the maintenance and adjustment of the operator on the user side without stopping the line of the factory.

A fourth aspect of the invention is directed to the remote adjusting and diagnosing apparatus for a control object, wherein the control parameter is a servo gain.

According to the remote adjusting and diagnosing apparatus having the structure described above, the servo gain is adjusted when an environment is regulated, for example, the operator on the user side attaches a load to the control object. Consequently, the servo gain previously adapted roughly at time of a shipment from a factory can be safely adjusted with high precision corresponding to the load.

A fifth aspect of the invention is directed to the remote adjusting and diagnosing apparatus for a control object, wherein the control parameter is an inherent condition parameter in an application.

According to the remote adjusting and diagnosing apparatus for a control object in accordance with the fifth aspect of the invention, when the application or the work of the control object is changed, the inherent condition parameter in the application is adjusted. Consequently, the operator on the manufacturer side having know-how can set conditions, and a time can be considerably shortened and quality can be maintained and enhanced.

A sixth aspect of the invention is directed to the remote adjusting and diagnosing apparatus for a control object, wherein the same control object as that of a remote place is used in place of the simulator section of the analyzing computer.

According to the remote adjusting and diagnosing apparatus for a control object in accordance with the sixth aspect of the invention, an adjustment requiring a large-sized measuring device can also be carried out by using the same control object as that of the user side for the adjustment. Furthermore, it is possible to considerably reduce a time and labor without stopping the line of a factory.

A seventh aspect of the invention is directed to the remote adjusting and diagnosing apparatus for a control object, wherein the analyzing computer has a command generating section for creating an operation command of the control object, a data transmitting section for transmitting the operation command to the diagnosing computer, a data receiving section for receiving a state quantity of the control object from the diagnosing computer, a data storage section for selectively storing data to be transmitted by the data transmitting section and data received by the data receiving section, and a control parameter adjusting section for adjusting a control parameter of the control object.

An eighth aspect of the invention is directed to the remote adjusting and diagnosing apparatus for a control object, wherein the command generating section of the analyzing computer has a remote control function and operates a control object used in a remote place.

According to the remote adjusting and diagnosing apparatus for a control object including a motor in accordance with the first, third, seventh and eighth aspects of the invention, the adjustment to be carried out by the operator on the manufacturer side going to the factory on the user side can easily be performed through the analyzing computer on the manufacturer side. Moreover, the control object itself used by the user is controlled. Therefore, it is possible to carry out an adjustment with high precision for the aging of the control object.

A ninth aspect of the invention is directed to the remote adjusting and diagnosing apparatus for a control object, wherein the data transmitting section of the diagnosing computer periodically transmits the state quantity of the control object to the analyzing computer and transmits the state quantity of the control object when the controller state deciding section makes a decision of abnormality and/or a request for a transmission is given.

According to the remote adjusting and diagnosing apparatus for a control object including a motor in accordance with the ninth aspect of the invention, the state quantity of the control object is periodically transmitted to the analyzing computer automatically. Therefore, the analyzing computer can periodically monitor the control object used by the user, and furthermore, a countermeasure can be quickly taken against an abnormal situation and a request for a transmission. Consequently, it is possible to remarkably reduce a time and labor taken from the analysis of the cause of the abnormality of the control object to the solution of the problem.

A tenth aspect of the invention is directed to the remote adjusting and diagnosing apparatus for a control object, wherein there is provided a failure diagnosing and predicting section for transmitting the operation command and the state quantity of the control object from the diagnosing computer to the analyzing computer and deciding and estimating presence of abnormality from the state quantity of the control object in a play-back operation of the control object.

According to the remote adjusting and diagnosing apparatus for a control object in accordance with the tenth aspect of the invention, the state quantity of the control object on the user side is successively transmitted to the analyzing computer to estimate and decide a failure in a normal play-back operation. Consequently, it is possible to monitor the state of the control object on the user side, thereby preventing the failure.

An eleventh aspect of the invention is directed to the remote adjusting and diagnosing apparatus for a control object, wherein there are provided a condition setting section for setting a condition of a position limitation of the control object in a rectangular coordinate system or a joint coordinate system over the controller when the control parameter is to be adjusted, and a condition collating section for transferring the condition of the position limitation set by the condition setting section to the diagnosing computer and collating an interference of an operation command for the control parameter adjustment received from the analyzing computer in the diagnosing computer with the condition of the position limitation, and an operation command interference signal and the condition of the position limitation are transmitted from the data transmitting section to the analyzing computer when the interference is caused, and an operation signal for the control parameter adjustment is re-created based on the operation command interference signal and the condition of the position limitation in the command generating section of the analyzing computer.

According to the remote adjusting and diagnosing apparatus for a control object in accordance with the eleventh aspect of the invention, the condition of the position limitation of the control object in the rectangular coordinate system or the joint coordinate system set through the condition setting section of the controller by a user in a remote place is compared and collated with the operation command created by the command generating section of the analyzing computer in the condition collating section. If the interference is caused, the operation command interference signal and the condition of the position limitation set by the user are returned to the analyzing computer to re-create the operation command. Therefore, the adjustment of the control parameter can be prohibited in a position which is previously decided to be dangerous by the user. Thus, a safety can be more enhanced.

A twelfth aspect of the invention is directed to the remote adjusting and diagnosing apparatus for a control object, wherein the analyzing computer includes the condition collating section, and the condition of the position limitation set by the condition setting section is transmitted to the analyzing computer to collate an interference of the operation command for the control parameter adjustment created by the command generating section of the analyzing computer with the condition of the position limitation in the condition collating section when the operation command for the control parameter adjustment is to be created in the command generating section of the analyzing computer, and the operation command for the control parameter adjustment is re-created if the interference is caused.

According to the remote adjusting and diagnosing apparatus for a control object in accordance with the twelfth aspect of the invention, when the operation command for a control parameter adjustment which is created by the command generating section of the analyzing computer is to be created, the interference with the condition of the position limitation of the user is checked. If the interference is caused, the re-creation can be carried out. Therefore, it is possible to lessen a transfer between the diagnosing computer and the analyzing computer, thereby shortening a time taken for adjusting the control parameter.

A thirteenth aspect of the invention is directed to the remote adjusting and diagnosing apparatus for a control object including a motor according to any of the first to twelfth aspects of the invention, wherein the diagnosing computer has a control parameter storage section capable of storing a plurality of control parameters.

According to the remote adjusting and diagnosing apparatus for a control object including a motor in accordance with the thirteenth aspect of the invention, the control parameter adjusted previously can be stored in the diagnosing computer. Also in the case in which the control object is returned to an original use by a change in the line of a factory, therefore, it is possible to shorten a time without carrying out a readjustment using the analyzing computer.

A fourteenth aspect of the invention is directed to the remote adjusting and diagnosing apparatus for a control object including a motor according to the thirteenth aspect of the invention, wherein the diagnosing computer has a simulator section for reproducing an operation and a state from a state quantity of the control object based on an operation command by using a model of the control object.

According to the remote adjusting and diagnosing apparatus for a control object including a motor in accordance with the fourteenth aspect of the invention, a conformation can be made in the simulator section before the previous control parameter stored in the control parameter storage section of the diagnosing computer is actually used for the control object. Consequently, the safety can be enhanced.

BRIEF DESCRIPTION OF THE DRAWINGS

FIG. 10 is a diagram showing a ninth embodiment of the invention, and FIG. 11 is a diagram showing a conventional control device.

BEST MODE FOR CARRYING OUT THE INVENTION

Figure 1:
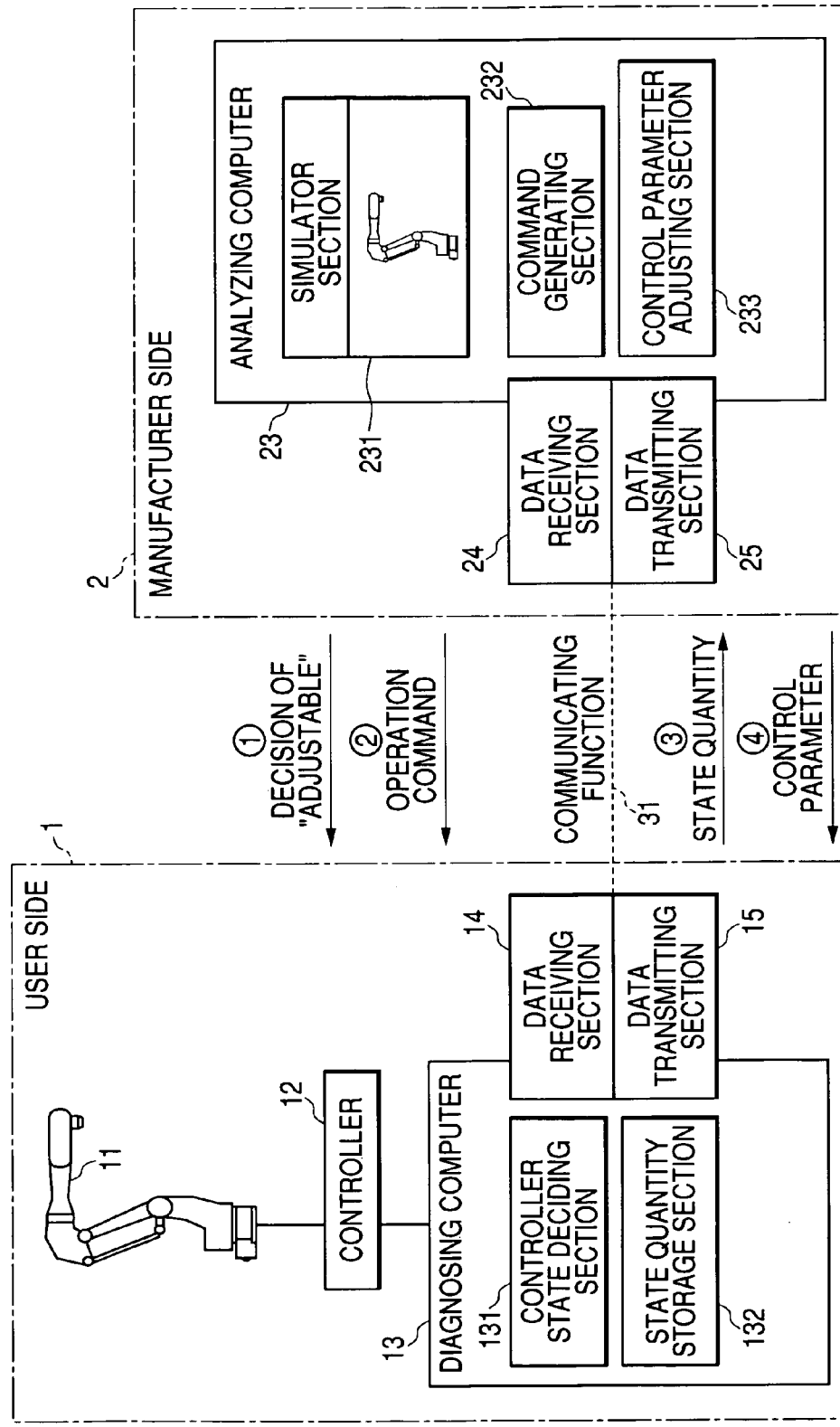
FIG. 1 is a diagram showing a first embodiment of the invention.

A first embodiment of the invention will be described below with a control object shown as a robot in FIG. 1. In the first embodiment, as described in the first aspect of the invention, a robot apparatus comprising a robot 11 provided in the line of a factory on a user side 1 and a controller 12 for controlling the robot 11 is constituted by a diagnosing computer 13 connected to the controller 12 and acquiring the control state quantity of the robot 11, an analyzing computer 23 provided in a service center on a manufacturer side 2 (hereinafter referred to as a "manufacturer side") which is distant from the factory on the user side 1 in which the robot 11 is provided, and a communicating function 31, for example, a telephone circuit for connecting both of the computers 13 and 23, a commercial communication line such as internet, a private circuit such as an LAN, or a radio communication. According to the first embodiment, an existing communicating system is thus used and plant and equipment investment is not newly required.

There is a method of connecting the diagnosing computer 13 and the controller 12 through a cable, bus connection or radio format. The diagnosing computer 13 may be of such a type as to be provided in a personal computer or the controller 12 and the controller 12 may be caused to have the function of storing the state quantity of the diagnosing computer 13 and transmitting and receiving data, thereby omitting an installation space for the diagnosing computer 13.

On the other hand, as described in the second aspect of the invention, the analyzing computer 23 is constituted by a command generating section 232 for creating an operation command for a control parameter adjustment of the robot 11, a data transmitting section 25 for transmitting the operation command to the diagnosing computer 13, a data receiving section 24 for receiving the state quantity of the robot 11 in response to the operation command from the diagnosing computer 13, a simulator section 231 for reproducing an operation and a state from the state quantity of the robot 11 by using the model of the robot 11, and a control parameter adjusting section 233 for adjusting a control parameter from the result of the simulator section 231.

The command generating section 232 generates the operation command of a specific operation pattern when a servo gain is to be adjusted, and generates a welding condition and an operation command when an inherent condition parameter in an application such as arc welding is to be adjusted. Alternatively, data prestored in the memory of the analyzing computer 23 may be read to be the operation command.

The simulator section 231 previously inputs a model for the robot in a remote place (the length, weight or rigidity of each link or the type of a motor, a reduction gear or a welding machine), and can create a control state quantity which is equal or approximate to that of an actual machine through the simulator section 231 by inputting the same operation command as that of the actual machine.

The control parameter adjusting section 233 compares the control state quantity obtained by the simulator section 231 with the control state quantity of the robot 11 which is transmitted from the diagnosing computer 13 and adjusts a control parameter (a servo gain) in such a manner that their difference is reduced. For example, in the case in which the position deviation of the actual robot 11 is greater than that of the model of the simulator section 231, a position gain is increased.

As described in the third aspect of the invention, furthermore, the diagnosing computer 13 is constituted by a state quantity storage section 132 for storing the state quantity of a control object, a controller state deciding section 131 for deciding whether the controller of the control object can correspond to a maintenance and an adjustment, a data receiving section 14 for receiving an operation command transmitted from the analyzing computer 23, and a data transmitting section 15 for transmitting the state quantity of the control object to the analyzing computer 23.

Moreover, the analyzing computer 13 also has the function of storing a control parameter transmitted from the analyzing computer 23 in the controller 12 and deciding whether the controller 12 can adjust a control parameter in response to the command of the analyzing computer 23.

Referring to a basic method of adjusting a control parameter, the action of each block will be described below.

(1) Decision of Adjustment Preparation

An operator on the manufacturer side 2 generates a state decision command for adjusting the control parameter of the robot 11 for the diagnosing computer 13 present in a remote place through the command generating section 232 of the analyzing computer 23. The state decision command is transmitted from the data transmitting section 25 to the data receiving section 14 of the diagnosing computer 13 through the commercial communication line 31 such as a telephone circuit (① in the drawing).

In the case in which it is decided from the state of the robot 11 connected to the controller 12 that the control parameter can be adjusted in the controller state deciding section 131 of the diagnosing computer 13, a signal of "adjustable" is sent from the data transmitting section 15 to the data receiving section 24 of the analyzing computer 23. Upon receipt of this signal, the analyzing computer 23 transmits an operation command to the data receiving section 14 of the diagnosing computer 13 (② in the drawing).

In the case in which the adjustment cannot be carried out during an emergency stop or a play-back operation, the controller state deciding section 131 of the diagnosing computer 13 carries out a processing of giving an instruction for adjusting the control parameter to an operator on the user side 1.

(2) Execution of Operation and Storage of Control State Quantity

The diagnosing computer 13 sends the transmitted operation command ② and a control parameter in an initial state to the controller 12 and stores them in the controller 12, and causes the robot 11 to carry out an operation based on the operation command when the controller 12 side is in preparation. The control state quantity of the robot 11 in this operation (for example, a position FB, a speed FB or a torque command) is transferred from the controller 12 to the diagnosing computer 13 in a specific sampling cycle and is stored in the state quantity storage section 132. Alternatively, it is also possible to employ a structure in which all the control state quantities in the operation are stored in the controller 12, and are transferred in a lump to the diagnosing computer 13 after the end of the operation based on the operation command and are stored in the state quantity storage section 132.

(3) Transfer of Control State Quantity

At time of the end of the operation of the robot 11 or in response to the command sent from the analyzing computer 23, the diagnosing computer 13 transfers the control state quantity of the robot 11 stored in the state quantity storage section 132 from the data transmitting section 15 to the analyzing computer 23 through the commercial communication line 31 such as a telephone circuit (③ in the drawing). Referring to the control state quantity to be transferred, it is also possible to employ a structure in which only necessary information such as a position FB or a torque command can be selected and transferred in order to decrease an information content and to increase a communication speed.

(4) Adjustment of Control Parameter

The simulator section 231 of the analyzing computer 23 reproduces the operation of the robot 11 present in a remote place by using the operation command created in the command generating section 232, the control state quantity of the robot 11 received by the data receiving section 24 and the same model as the robot 11 in the remote place. The control parameter adjusting section 233 of the analyzing computer 23 compares an operation waveform simulated from the operation command and the model with an operation waveform of a control state quantity acquired from an actual machine, thereby automatically deciding whether the control parameter is optimum. Moreover, it is also possible to employ a structure in which the decision is carried out by the operator on the manufacturer side 2 manipulating the analyzing computer 23.

(5) Confirmation of Operation

In the case in which it is decided that the control parameter is optimum, the analyzing computer 23 transmits the control parameter from the data transmitting section 25 to the data receiving section 14 of the diagnosing computer 13 through the commercial communication line 31 such as a telephone circuit (④ in the drawing). The diagnosing computer 13 sends the transmitted control parameter to the controller and stores the same in the controller. Thus, the adjustment of the control parameter is completed. For a confirmation, the robot 11 is caused to carry out the operation in accordance with the operation command for the control parameter adjustment, thereby entrusting the decision to the operator on the user side 1 again. Consequently, the control parameter can be adjusted more reliably and it is also possible to ascertain whether the operation of the robot 11 after the control parameter adjustment is set to have such a level as to satisfy the user.

(6) Readjustment

In the case in which it is decided that the control parameter is not optimum, the control parameter adjusting section 233 of the analyzing computer 23 self-adjusts the control parameter to approximate to the optimum operation waveform of a simulation. The control parameter thus adjusted is transmitted from the data transmitting section 25 to the diagnosing computer 13 through the commercial communication line 31. The diagnosing computer 13 sends the control parameter received by the data receiving section 14 to the controller and stores the same in the controller, thereby operating the robot 11. At this time, the control state quantity of the robot 11 is transmitted to the analyzing computer 23 in the same manner as that in the last adjustment, and an operation waveform simulated again is compared with the operation waveform of the control state quantity in the simulator section 231 of the analyzing computer 23, and the processing is repeated until the control parameter adjusting section 233 makes a decision of the optimum operation waveform.

Although the operator on the manufacturer side 2 conventionally goes to a factory on the user side 1 to adjust the control parameter, the structure of such a system can easily carry out the same adjustment through the analyzing computer 23 on the manufacturer side 2. Moreover, it is possible to immediately take a countermeasure in response to a request for the maintenance and adjustment of the operator on the user side 1 without stopping the line of a factory.

Next, a second embodiment of the invention will be described with reference to FIG. 2.

As described in the fourth aspect of the invention, the action of each block will be described on the assumption that the servo gain adjustment of a robot 12 is carried out.

(1) Decision of Adjustment Preparation

An operator on a manufacturer side 2 generates a state decision command for adjusting the servo gain of the robot 11 for a diagnosing computer 13 present in a remote place by a command generating section 232 of an analyzing computer 23. The state decision command is transmitted from a data transmitting section 25 to a data receiving section of the diagnosing computer through a commercial communication line 32 such as a telephone circuit (① in the drawing).

In the case in which it is decided from the state of the robot 11 connected to a controller 12 that the gain can be adjusted in a controller state deciding section 131 of the diagnosing computer 13, a signal of "servo gain adjustable" is sent from a data transmitting section 15 to a data receiving section 24 of the analyzing computer 23. Upon receipt of this signal, the analyzing computer 23 transmits an operation command for a gain adjustment to the data receiving section 14 of the diagnosing computer 13 (② in the drawing).

In the case in which the gain adjustment cannot be carried out during an emergency stop or a play-back operation, the controller state deciding section 131 of the diagnosing computer 13 carries out a processing of giving an instruction for adjusting the servo gain to an operator on a user side 1.

(2) Execution of Operation for Gain Adjustment and Storage of Control State Quantity The diagnosing computer 13 sends the transmitted operation command for a gain adjustment and a servo gain in an initial state to the controller 12 and stores them in the controller 12, and causes the robot 11 to carry out an operation based on the operation command for the gain adjustment when the controller 12 side is in preparation.

The control state quantity of the robot 11 in this operation (for example, a position FB, a speed FB or a torque command) is transferred from the controller 12 to the diagnosing computer 13 in a specific sampling cycle and is stored in a state quantity storage section 132. Alternatively, it is also possible to employ a structure in which all the control state quantities in the operation are stored in the controller 12, and are transferred in a lump to the diagnosing computer 13 after the end of the operation based on the operation command and are stored in the state quantity storage section 132.

(3) Transfer of Control State Quantity

At time of the end of the operation of the robot 11 or in response to the command sent from the analyzing computer 23, the diagnosing computer 13 transfers the control state quantity of the robot 11 stored in the state quantity storage section 132 from the data transmitting section 15 to the analyzing computer 23 through the commercial communication line 32 such as a telephone circuit (③ in the drawing). Referring to the control state quantity to be transferred, it is also possible to employ a structure in which only necessary information such as a position FB or a torque command can be selected and transferred in order to decrease an information content and to increase a communication speed.

(4) Gain Adjustment

A simulator section 231 of the analyzing computer 23 reproduces the operation of the robot 11 present in a remote place by using the operation command created in the command generating section 232, the control state quantity of the robot 11 received by the data receiving section 24 and the same model as the robot 11 in the remote place. A control parameter adjusting section 233 of the analyzing computer 23 compares an operation waveform simulated from the operation command and the model with an operation waveform of a control state quantity acquired from an actual machine, thereby automatically deciding whether the servo gain is optimum. Moreover, it is also possible to employ a structure in which the decision is carried out by the operator on the manufacturer side 2 manipulating the analyzing computer 23.

(5) Confirmation of Operation

In the case in which it is decided that the servo gain is optimum, the analyzing computer 23 transmits the servo gain from the data transmitting section 25 to the data receiving section 14 of the diagnosing computer 13 through the commercial communication line 32 such as a telephone circuit (④ in the drawing). The diagnosing computer 13 sends the transmitted servo gain to the controller 12 and stores the same in the controller 12. Thus, the adjustment of the servo gain is completed. For a confirmation, the robot 11 is caused to carry out the operation in accordance with the operation command for the gain adjustment, thereby entrusting the decision to the operator on the user side 1 again. Consequently, the servo gain can be adjusted more reliably and it is also possible to ascertain whether the operation of the robot after the gain adjustment is set to have such a level as to satisfy the user.

(6) Readjustment

In the case in which it is decided that the servo gain is not optimum, the control parameter adjusting section 233 of the analyzing computer 23 self-adjusts the servo gain to approximate to the optimum operation waveform of a simulation. The servo gain thus adjusted is transmitted from the data transmitting section 25 to the diagnosing computer 13 through the commercial communication line 32. The diagnosing computer 13 sends the servo gain received by the data receiving section 14 to the controller 12 and stores the same in the controller 12, thereby operating the robot 11. At this time, the control state quantity of the robot 11 is transmitted to the analyzing computer 23 in the same manner as that in the last adjustment, and an operation waveform simulated again in the simulator section 231 of the analyzing computer 23 is compared with the operation waveform of the control state quantity, and the processing is repeated until the control parameter adjusting section 233 makes a decision of the optimum operation waveform.

Figure 2:
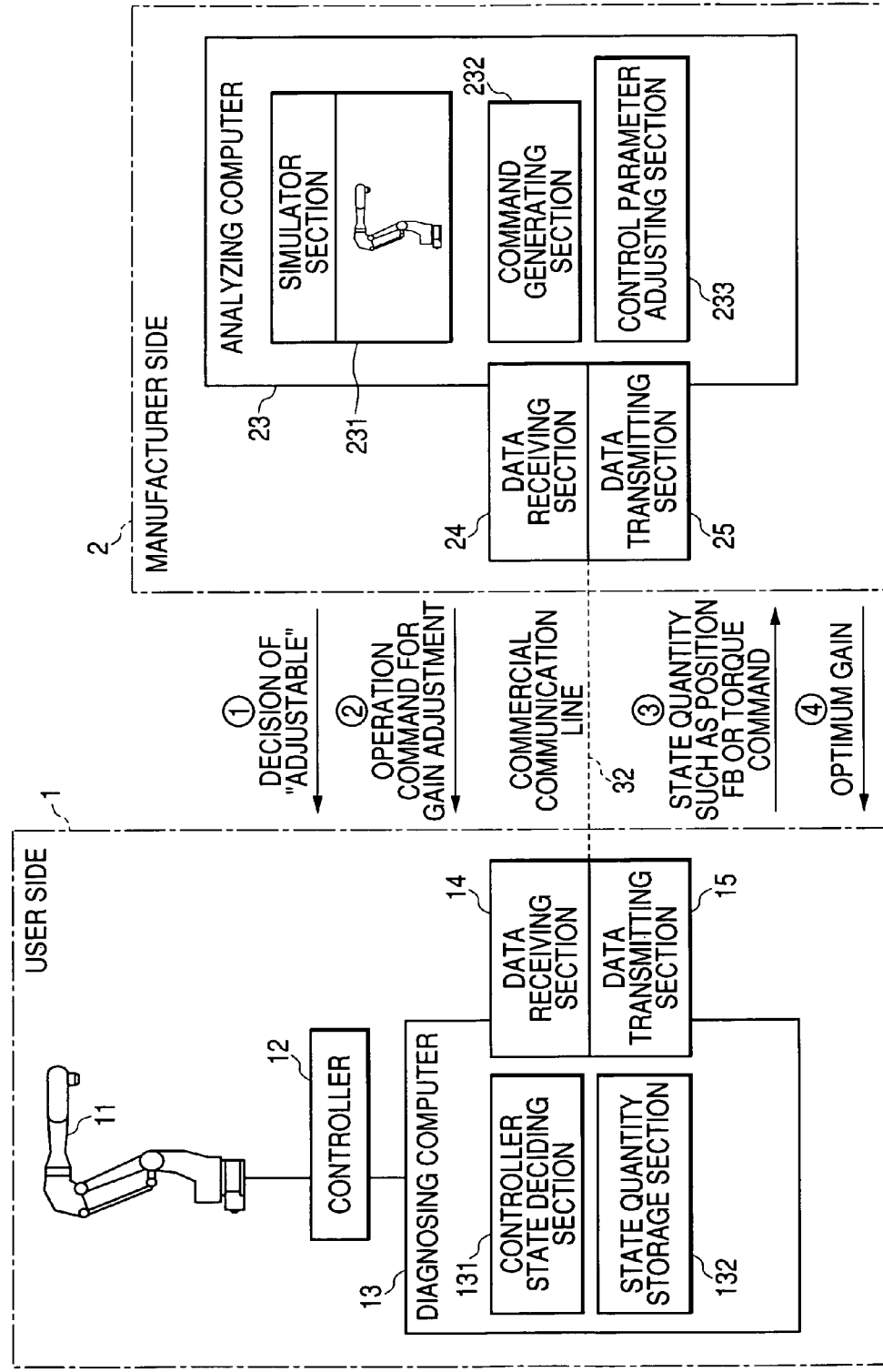
FIG. 2 is a diagram showing a second embodiment of the invention.
Figure 3:
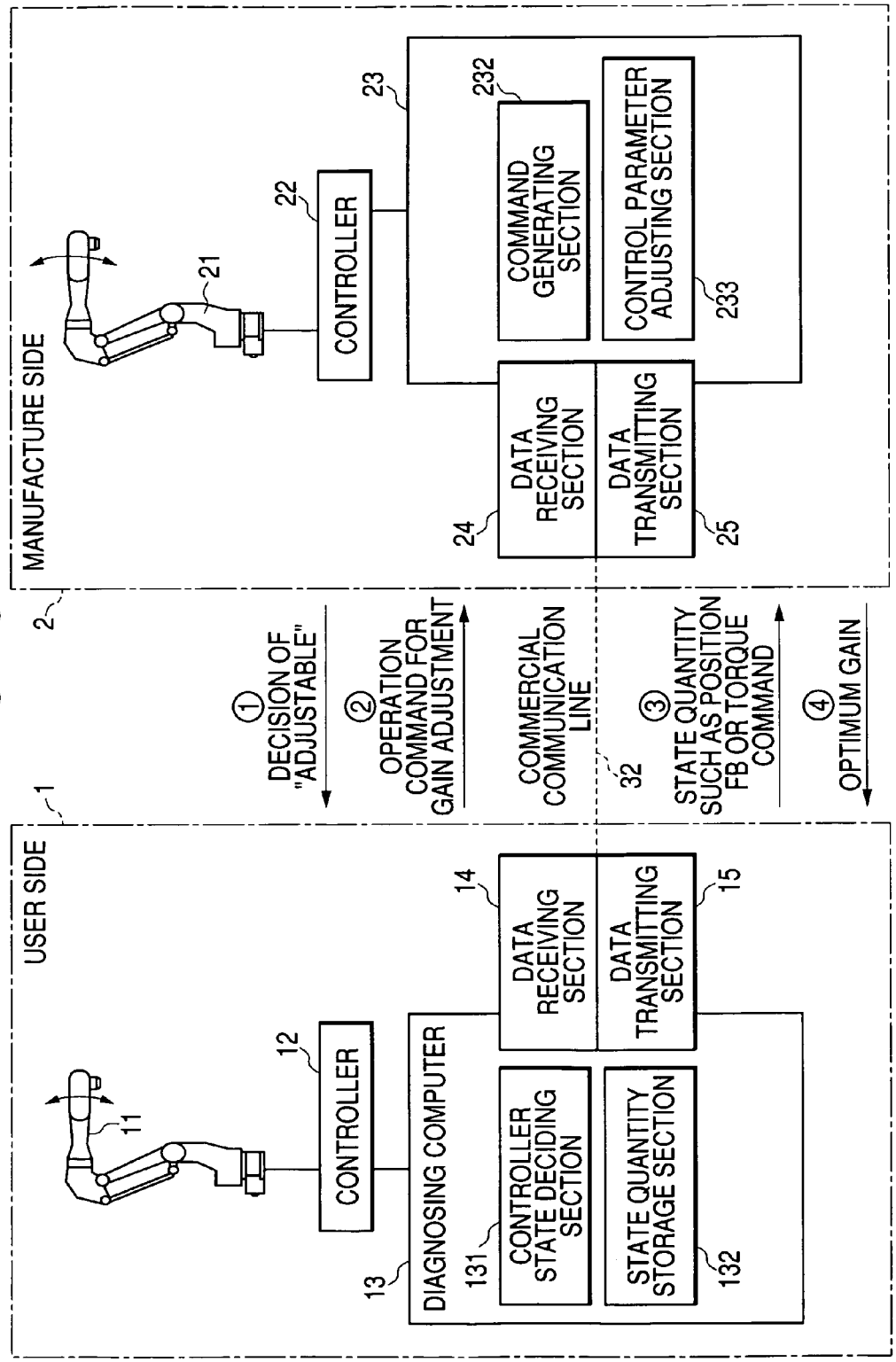
FIG. 3 is a diagram showing a variant of the second embodiment according to the invention.

FIG. 3 shows the case in which the operation is reproduced by using the same actual machine 21 as the robot 11 present in a remote place in place of the simulator section 231 of the analyzing computer 23 in FIGS. 1 and 2. By using the same actual machine as the robot present in the remote place in place of the simulator section 231, thus, it is possible to previously adjust the control parameter to some extent, thereby shortening a time.

Furthermore, the operator on the manufacturer side 2 can recognize an abnormal sound or a vibration which is not made in the simulation earlier than the operator on the user side 1. Therefore, a safety can be more enhanced than that in the simulator section 231. Also in case of the adjustment and maintenance requiring a large-sized measuring device, the measuring device does not need to be transported to the factory on the user side. Thus, the adjustment can be carried out in the factory on the manufacturer side.

Moreover, it is also possible to employ a structure in which the simulation and the robot of the actual machine are used together, which is not shown. If the servo gain is adjusted by the simulator section 231 based on the control state quantity of the operation of the robot 11 on the user side 1, and the operation is confirmed by the actual machine 21 on the manufacturer side 2 using the servo gain thus obtained and the servo gain is then transmitted to the user side 1, the safety can be more enhanced.

In the case in which the adjustment is to be carried out during the play-back operation, the control state quantity based on an operation command for an actual work in the controller 12 is acquired without the transmission of an operation command from the command generating section 232 of the analyzing computer 23. When acquiring the control state quantity, the diagnosing computer 13 transmits the operation command and the control state quantity in the actual work to the analyzing computer 23 and subsequently optimizes the control parameter in the analyzing computer 23 as described above. Thus, the control state quantity is acquired by using the actual operation command. Consequently, it is possible to adjust the control parameter without stopping the line of the factory.

Figure 4:
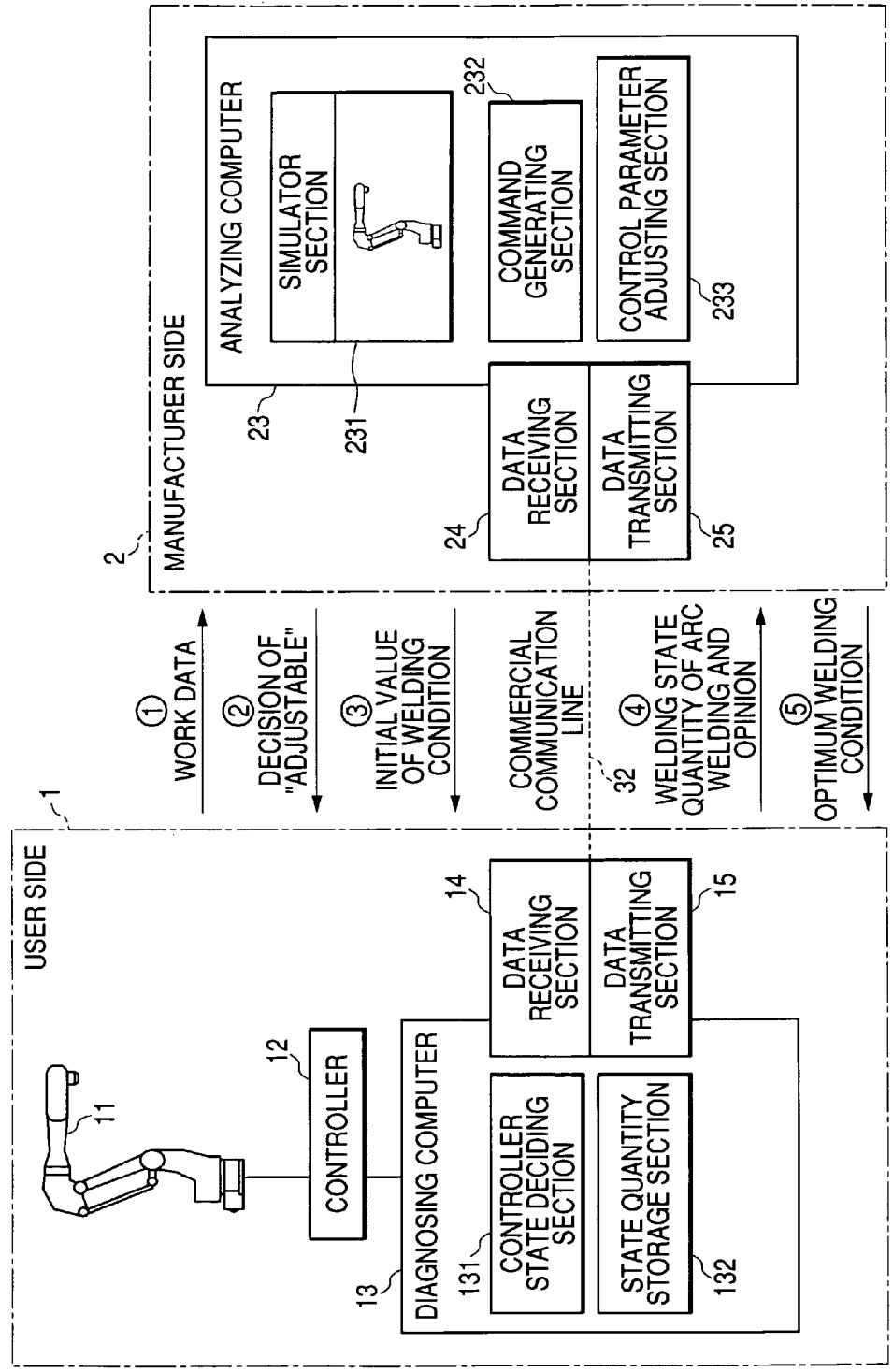
FIG. 4 is a diagram showing a third embodiment of the invention.

Next, a third embodiment of the invention will be described below with reference to FIG. 4.

As described in the fifth aspect of the invention, the action of each block will be described on the assumption that the welding condition of arc welding to be carried out by a robot is to be adjusted for the adjustment of an inherent condition parameter in an application. The condition parameter of the welding condition includes a welding speed, a welding torch angle and a feeding speed of a welding wire feeding motor.

(1) Acquirement of Work Data

The condition of the arc welding is greatly varied depending on the shape and material of a work. For this reason, it is necessary to previously limit the condition to some extent. Therefore, the operator on a user side 1 registers the shape and material of the work to be subjected to the arc welding in a controller 12 or a diagnosing computer 13. Data on the shape and material of the work which are thus registered are transmitted from a data transmitting section 15 to a command generating section 232 of an analyzing computer 23 on a manufacturer side 2 through a commercial communication line 32 (① in the drawing).

(2) Decision of Adjustment Preparation

An operator on the manufacturer side 2 is to check whether the adjustment can be carried out by a robot 11 present in a remote place. Therefore, the operator generates a state decision command for adjusting the welding condition of the arc welding by the robot 11 for the diagnosing computer 13 present in a remote place through the command generating section 232 of the analyzing computer 23. The state decision command is transmitted from a data transmitting section 25 to a data receiving section 14 of the diagnosing computer 13 through the commercial communication line 32 (② in the drawing).

In the case in which it is decided from the state of the connected robot 11 that the welding condition can be adjusted, a signal of "welding condition adjustable" is sent from the data transmitting section 15 to the analyzing computer 23. Upon receipt of this signal, the analyzing computer 23 transmits the initial value of the welding condition to the diagnosing computer 13 (③ in the drawing).

In the case in which the welding condition cannot be adjusted during a play-back operation or an emergency stop, the diagnosing computer 13 carries out a processing of giving an instruction for adjusting the welding condition to the operator on the user side 1.

(3) Execution of Arc Welding and Storage of Welding State Quantity

The diagnosing computer 13 sends the initial value of the welding condition received by the data receiving section 14 to the controller 12 and stores the same in the controller 12. When the controller 12 side is in preparation, the robot 11 is caused to carry out the arc welding based on the initial value of the welding condition and a program created by the operator on the user side 1. The welding state quantity in the arc welding (for example, a welding voltage and a welding current as well as a welding speed) is transferred from the controller 12 to the diagnosing computer 13 in a specific sampling cycle and is stored in a state quantity storage section 132. Alternatively, all the welding state quantities in the arc welding are stored in the controller 12 and are transferred to and stored in the state quantity storage section 132 of the diagnosing computer 13 in a lump after the end of the welding.

(4) Transfer of Welding State Quantity

At time of the end of the operation of the robot 11 or in response to the command sent from the analyzing computer 23, the diagnosing computer 13 transfers the welding state quantity stored in the state quantity storage section 132 from the data transmitting section 15 to the analyzing computer 23 through the commercial communication line 32 (④ in the drawing). Referring to the welding state quantity to be transferred, it is also possible to employ a structure in which a welding voltage, a welding current or a welding speed can be selected if necessary in order to decrease an information content and to increase a communication speed. With such a structure that the degree of satisfaction and opinions of the operator on the user side 1 for the result of the welding of a work are also input to the diagnosing computer 13 and are transferred to the analyzing computer 23, it is possible to approximate to a work to be satisfied by the operator on the user side 1 in a shorter time.

(5) Adjustment of Welding Condition

A simulator section 231 of the analyzing computer 23 reproduces the arc welding by the robot 11 present in a remote place by using the welding condition created by the command generating section 232 and the welding state quantity which is transferred. The control parameter adjusting section of the analyzing computer 23 compares a result (a welding state quantity) simulated from the data of the work and the welding condition with the welding state quantity thus transferred, thereby automatically deciding whether an optimum penetration and bonding can be carried out. Moreover, it is also possible to employ a structure in which the decision is carried out by the operator on the manufacturer side 2 manipulating the analyzing computer 23. It is also possible to adjust the welding condition (the welding speed, the welding torch angle or the feeding speed of the welding wire feeding motor) in order to obtain a specification (a penetration and a bonding state) desired by the user side 1. In the case in which the manufacturer side 2 has the same work as the work on the user side 1, furthermore, it is possible to actually carry out the arc welding, thereby measuring a bonding strength or confirming the penetration shape of a section.

(6) Confirmation of Condition

In the case in which it is decided that the welding condition is optimum, the analyzing computer 23 transmits the welding condition from the data transmitting section 25 to the diagnosing computer 13 through the commercial communication line (⑤ in the drawing). The diagnosing computer 13 sends the welding condition received by the data receipt to the controller 12 and stores the same in the controller 12. Thus, the adjustment of the welding condition is completed. For a confirmation, the robot 11 is caused to carry out the arc welding in accordance with the welding condition, thereby entrusting the decision to the operator on the user side 1 again. Consequently, the welding condition can be adjusted more reliably and it is also possible to ascertain whether the state of the arc welding obtained after the welding condition adjustment is set to have such a level as to satisfy the user side 1.

(7) Readjustment

In the case in which it is decided that the welding condition is not optimum, a control parameter adjusting section of the analyzing computer 23 self-adjusts the welding condition to approximate to the optimum result of a simulation. The welding condition thus adjusted is transmitted from the data transmitting section 25 to the diagnosing computer 13 through the commercial communication line. The diagnosing computer 13 sends the welding condition received by the data receipt to the controller 12 and stores the same in the controller 12, thereby executing the arc welding again. At this time, the welding state quantity of the arc welding is transmitted to the analyzing computer 23 in the same manner as that in the last adjustment, and a result obtained by the simulation again in the simulator section of the analyzing computer 23 is compared with the welding state quantity, and the processing is repeated until the control parameter adjusting section makes a decision of the optimum welding condition.

Figure 5:
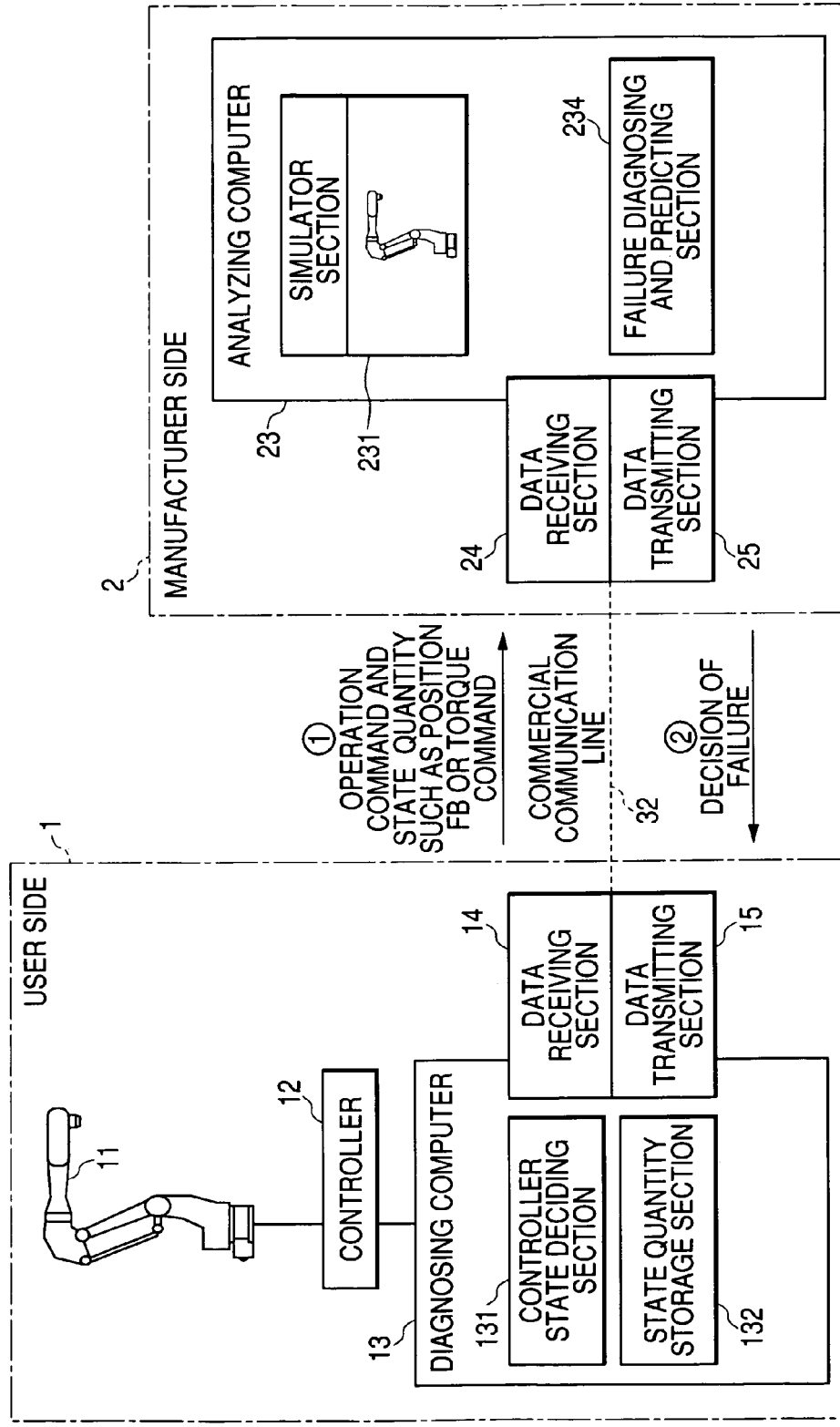
FIG. 5 is a diagram showing a fourth embodiment of the invention.

Next, a fourth embodiment of the invention will be described with reference to FIG. 5.

The action of each block will be described on the assumption of the diagnosis and prediction of a failure in a play-back operation. As described in the seventh aspect of the invention, an analyzing computer 23 is constituted by a data transmitting section 25, a data receiving section 24, a simulator section 231, and a failure diagnosing and predicting section 234 for deciding and estimating the presence of the abnormality of the operation of a robot 11 from the operation command and state quantity of the robot 11.

In the play-back operation of the robot 11, an operation command created by an operator on a user side 1 and the control state quantity of the robot 11 are stored in a state quantity storage section 132 in a specific sampling cycle. At time of the end of the operation or in response to the command sent from the analyzing computer 23, they are transmitted from a data transmitting section 15 of a diagnosing computer 13 to the analyzing computer 23. The failure diagnosing and predicting section 234 of the analyzing computer 23 compares the operation waveform of a simulation in accordance with the operation command with the control state quantity of the robot 11, and decides that the operation or setting of the robot 11 is abnormal and transmits a request for an emergency stop or a control parameter adjustment to a controller 12 through the diagnosing computer 13 if there is a deviation which is equal to or greater than a specific threshold.

By storing a past control state quantity to extract a variation also in the same operation as the play-back operation, moreover, it is also possible to decide a state quantity which is changed temporally, for example, the wear-out of a reduction gear.

For example, the case in which a foreign substance invades the reduction gear of the robot 11 in an actual machine will be considered. By periodically storing the waveforms of torque commands and successively comparing them, it is possible to detect the invasion of the foreign substance by the generation of a noise in the torque command of the actual machine.

Figure 6:
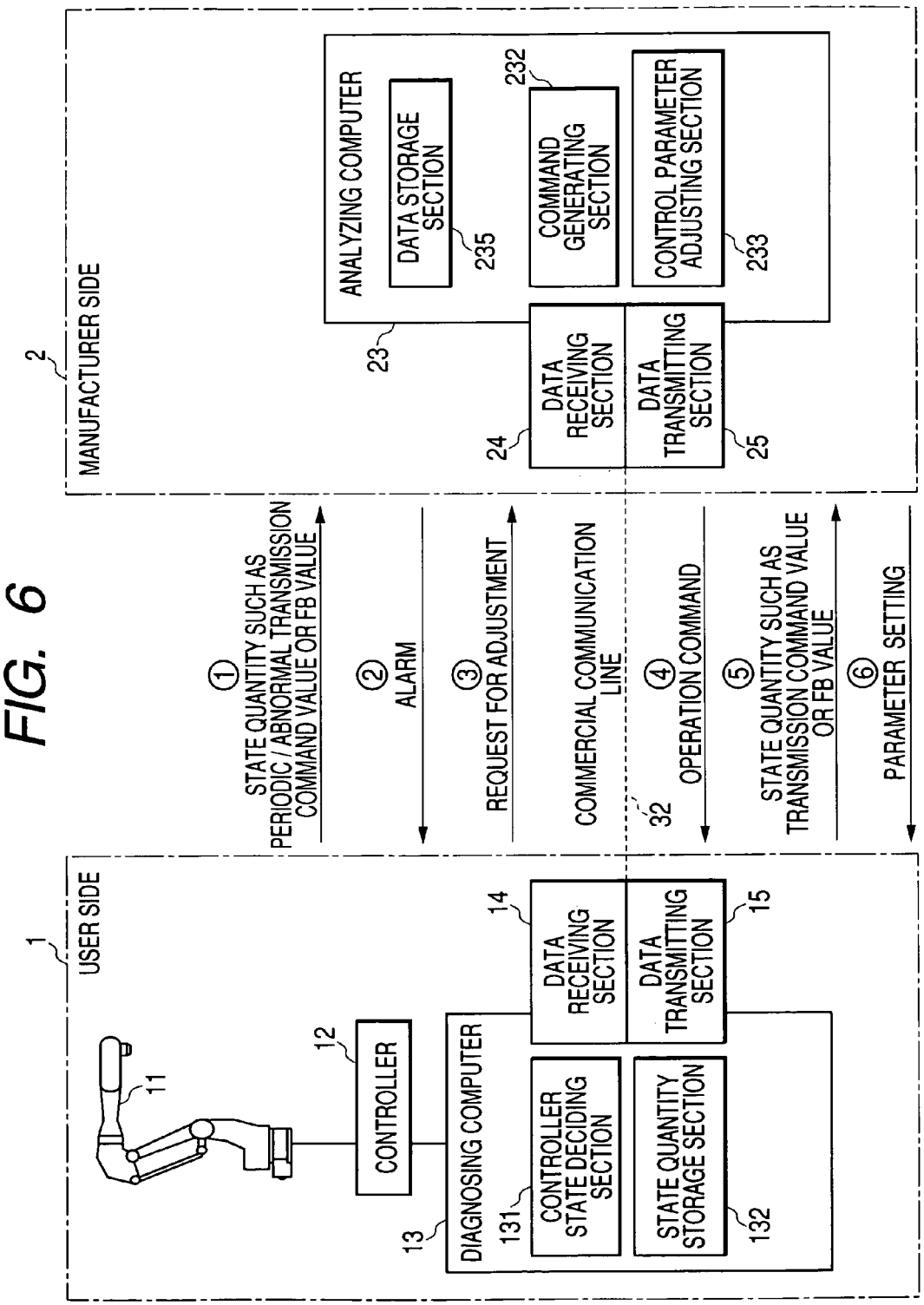
FIG. 6 is a diagram showing a fifth embodiment of the invention.

Referring to FIG. 6, next, as described in the seventh aspect of the invention, the analyzing computer 23 is constituted by a command generating section 232 for creating the operation command of the robot 11, the data transmitting section 25 for transmitting the operation command to the diagnosing computer 13, the data receiving section 24 for receiving the state quantity of the robot 11 in accordance with the operation command sent from the diagnosing computer 13, a control parameter adjusting section 233 for adjusting the control parameter of the robot 11 present in a remote place, and a data storage section 235 for selectively storing data transmitted by the data transmitting section 25 and data received by the data receiving section 24.

The command generating section 232 generates the operation command of a specific operation pattern when a servo gain is to be adjusted, and generates a welding condition and an operation command when an inherent condition parameter in an application, for example, arc welding is to be adjusted. Alternatively, the data prestored in the data storage section 235 of the analyzing computer 23 may be read to be an operation command.

The control parameter adjusting section 233 compares the position command value and position feedback value of the robot 11 in the control state quantity of the robot 11 transmitted from the diagnosing computer 13 and adjusts a control parameter (a servo gain) to decrease a difference, for example.

As described in the eighth aspect of the invention, furthermore, the command generating section 232 of the analyzing computer 23 has a remote control function and can operate a control object itself which is used in a remote place.

In some cases in which the robot 11 in a remote place is provided in a narrow environment, thus, there is a problem in that the robot 11 interferes with a surrounding work when the operation command is automatically generated. In the case in which a countermeasure cannot be taken by the automatic generation of the operation command, thus, it is possible to avoid the problem of the interference by manually carrying out a remote control while watching the operation of the robot 11 by means of a camera provided in a remote place, thereby generating an operation command.

As described in the ninth aspect of the invention, moreover, the data transmitting section 15 of the diagnosing computer 13 periodically transmits the state quantity of a control object to the analyzing computer 23, and can transmit the state quantity of the control object also when a controller state deciding section 131 makes a decision of abnormality and a request for a transmission is given.

Next, a fifth embodiment of the invention will be described with reference to FIG. 6.

Referring to a basic method of adjusting a control parameter, the action of each block will be described.

(1) Decision of Adjustment Preparation by Aging

A diagnosing computer 13 connected to a controller 12 of a robot 11 used on a user side 1 causes a state quantity storage section 132 to repetitively store the state quantity of the robot 11 by a predetermined capacity in the servo cycle of the robot 11 all the time. The diagnosing computer 13 periodically transmits the newest state quantity stored by a predetermined capacity under a predetermined date (one day or once a week) and information about a normal communication to an analyzing computer 23 automatically (① in FIG. 6).

The analyzing computer 23 receiving the data makes a decision of normal and periodic data transmitted from the diagnosing computer 13 and stores the state quantity therein, and furthermore, calculates a position deviation and a speed deviation. The analyzing computer 23 decides that the data are normal if the position deviation and the speed deviation are set within a predetermined set range, and gives a person in charge on a manufacturer side 2 an alarm indicating that abnormality might be generated when a set range is exceeded (② in FIG. 5) and also displays check request contents on the diagnosing computer 13.

(2) Decision of Adjustment Preparation During Abnormality

The diagnosing computer 13 connected to the controller 12 of the robot 11 used on the user side 1 causes the state quantity storage section 132 to repetitively store the state quantity of the robot 11 by a predetermined capacity in the servo cycle of the robot 11 all the time. In the case in which a controller state deciding section 131 of the diagnosing computer 13 makes a decision of an abnormal state, it transmits, to the analyzing computer 23, that abnormality is made with priority to a periodic transmission (① in the drawing).

At this time, the newest data obtained immediately before a time that the abnormality is generated are also transmitted to the analyzing computer 23 at the same time. The analyzing computer 23 receiving the data decides that the data are obtained during the abnormality from the diagnosing computer 13 and stores a state quantity, and furthermore, calculates a position deviation and a speed deviation.

The person in charge on the manufacturer side 2 investigates the cause of the abnormality and solves problems thereof with reference to past data stored in the analyzing computer 23, and a notice is given to the person in charge on the manufacturer side 2 through the analyzing computer 23 and an alarm is also transmitted to the diagnosing computer 13 (② in the drawing) to display the cause of the abnormality or the check request contents. At this time, if the cause of the abnormality collides with surrounding objects or a safety device is operated, the contents are presented to end a countermeasure.

In the case in which the cause of the abnormality requires physical countermeasures against the failure or breakage of the 23 through a commercial communication line 32 such as a telephone circuit (⑤ in the drawing).

Referring to the control state quantity to be transferred, it is also possible to employ a structure in which only necessary information such as a position FB or a torque command can be selected and transferred in order to decrease an information content and to increase a communication speed.

(5) Setting of Control Parameter

The analyzing computer 23 compares the waveforms of a command value and a feedback value from the control state quantity of the robot 11 which is received by a data receiving section 24, thereby automatically setting whether a control parameter is optimum. Moreover, it is also possible to employ a structure in which the setting is carried out by the operator on the manufacturer side 2 manipulating the analyzing computer 23.

The control parameter thus set is transmitted to a receiving section 14 of the diagnosing computer 13 (⑥ in the drawing).

The diagnosing computer 13 sends the received control parameter to the controller 12 and stores the same in the controller 12. For a confirmation, the robot 11 is caused to carry out the operation in accordance with the operation command for a control parameter adjustment, thereby entrusting the decision to the operator on the user side 1 again. Consequently, the control parameter can be adjusted more reliably and it is also possible to ascertain whether the operation of the robot 11 after the control parameter adjustment is set to have such a level as to satisfy the user.

(6) Readjustment

In the case in which it is decided that the control parameter is not optimum, the transfer of the control state quantity in (4) and the setting of the control parameter in (5) are repeated, thereby adjusting the control parameter to approximate to an optimum operation waveform.

With the structure of such a system, the adjustment of the control parameter which has conventionally been performed by the operator on the manufacturer side 2 going to the factory on the user side 1 can easily be carried out through the analyzing computer 23 on the manufacturer side 2. Moreover, the control parameter is adjusted by using an actual machine which is used by the user side 1. Therefore, it is also possible to take a countermeasure against the aging of the robot 11 and to immediately cope with a request for the maintenance and adjustment of the operator on the user side 1.

Figure 7:
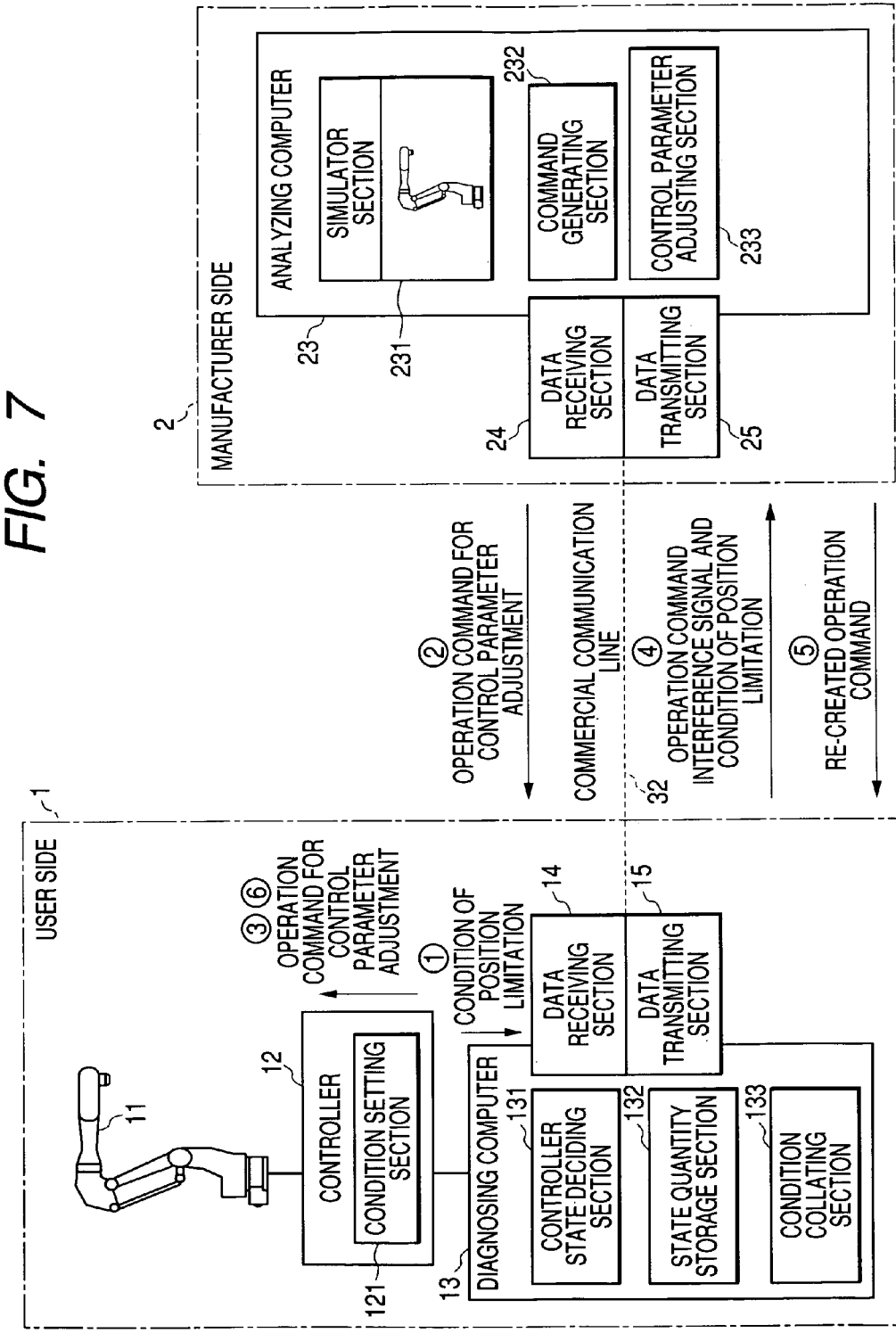
FIG. 7 is a diagram showing a sixth embodiment of the invention.

Next, a sixth embodiment of the invention will be described with reference to FIG. 7.

Description will be given to an action in which it is checked whether an operation command for a control parameter adjustment created by an analyzing computer 23 interferes with the condition of a position limitation set by a controller 12 based on the condition of the position limitation and the operation command is re-created if the operation command interferes with the condition of the position limitation.

As described in the eleventh aspect of the invention, a user side 1 present in a remote place is to set conditions such as a position limitation in the work area of a robot 11 to be a control object depending on a work. For example, there is set the position limitation in the case in which the end effector of the robot 11 enters a narrow portion.

As mentioned in the second embodiment, the description will be given on the basis of an example in which a control parameter is adjusted for a servo gain and there is a possibility that the end effector of the robot 11 might enter a narrow portion and the robot 11 might come in contact with a peripheral apparatus or a work which is provided in the narrow portion. There will be used a condition that a position limitation in a rectangular coordinate system is carried out.

(1) Condition Registration

The user side 1 present in a remote place registers the position information of a peripheral apparatus or a work present previously in a narrow portion to be the condition of the position limitation in the rectangular coordinate system in a condition setting section 121 of the controller 12 in such a manner that the end effector or arm of the robot 11 does not enter the position of the peripheral apparatus or the work. The condition of the position limitation is transferred from the controller 12 to a diagnosing computer 13 (① in the drawing).

In the case in which it is decided that a gain adjustment can be carried out in the state of the robot 11 connected to the controller 12 in a controller state deciding section 131 of the diagnosing computer 13, next, a signal of "servo gain adjustable" is sent from a data transmitting section 15 to a data receiving section 24 of the analyzing computer 23. Upon receipt of the signal of "servo gain adjustable", the analyzing computer 23 transmits an operation command for a gain adjustment created by a command generating section 232 for a control parameter adjustment to a data receiving section 14 of the diagnosing computer 13 (② in the drawing).

(2) Condition Collation

In the case in which the operation command for a servo gain adjustment is received by the data receiving section 14 of the diagnosing computer 13, it is not immediately transferred to the controller 12 of the robot 11 but a condition collating section 133 provided in the diagnosing computer 13. In the condition collating section 133, it is checked whether the operation command for the servo gain adjustment does not interfere with the condition of the position limitation which is previously registered. In the case in which the operation command for the servo gain adjustment is an angle command of each joint, it is possible to convert the operation command into a position in a task coordinate system and to collate the same position with the condition of the position limitation by using an arithmetic expression such as a sequential conversion.

In the case in which the interference is not particularly caused, the operation command for the servo gain adjustment is transferred to the controller 12 (③ in the drawing) to carry out an operation for the servo gain adjustment.

(3) Re-Creation of Operation Command

In the case in which the operation command interferes with the condition of the position limitation, an operation command interference signal and the condition of the position limitation are transmitted from the data transmitting section 15 to the analyzing computer 23 (④ in the drawing) and the operation command is not transferred to the controller 12.

When the operation command interference signal and the condition of the position limitation are received by the analyzing computer 23, an operation signal for the servo gain adjustment which does not interfere with the condition of the position limitation is re-created by the command generating section 232.

(4) Reconfirmation

The operation command for the servo gain adjustment thus re-created is transmitted to the diagnosing computer 13 again (⑤ in the drawing) and is checked by the condition collating section 133. If the interference is not caused, the re-created operation command is transferred to the controller 12 (⑥ in the drawing) to carry out an operation for the servo gain adjustment. If the interference is caused, the user side 1 sets the condition by a condition setting section 21 provided on the controller 12 more finely and repeats the (1) to (4) until an operation command which does not interfere is created.

In the same manner as in the second embodiment, subsequently, a control state quantity is stored and transferred and a gain adjustment is executed to transfer a servo gain to the diagnosing computer 13, thereby confirming an operation.

Figure 8:
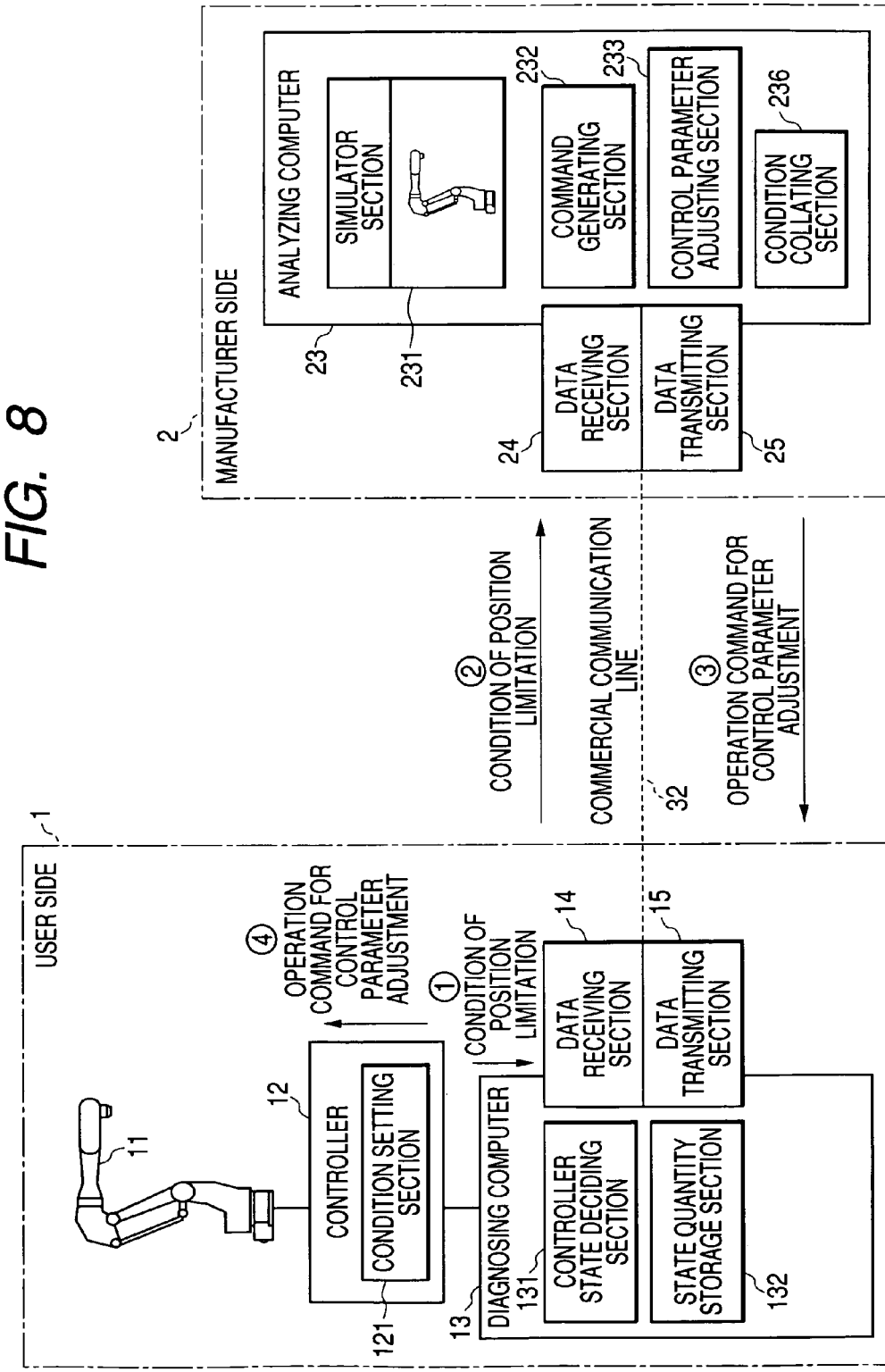
FIG. 8 is a diagram showing a seventh embodiment of the invention.

Next, a seventh embodiment of the invention will be described with reference to FIG. 8.

As described in the twelfth aspect of the invention, a user side 1 in a remote place transmits the condition of a position limitation registered by a condition setting section 121 of a controller 12 to an analyzing computer 23 through a diagnosing computer 13 and creates an operation command for a control parameter adjustment so as not to interfere with the condition of the position limitation. In the same manner as in the sixth embodiment of the invention, description will be given by taking the execution of a servo gain adjustment as an example.

(1) Condition Registration

The user side 1 present in a remote place registers the position information of a peripheral apparatus or a work present previously in a narrow portion to be the condition of a position limitation in a rectangular coordinate system in the condition setting section 121 of the controller 12 in such a manner that the end effector or arm of a robot 11 does not enter the position of the peripheral apparatus or the work. The condition of the position limitation is transferred from the controller 12 to the diagnosing computer 13 (① in the drawing).

Next, the condition of the position limitation is transmitted from a data transmitting section 15 of the diagnosing computer 13 to a data receiving section 24 of the analyzing computer 23 through a commercial communication line 32 (② in the drawing) and is set to a command generating section 232.

(2) Creation of Operation Command

In the command generating section 232 of the analyzing computer 23, an operation command for a servo gain adjustment is created for a control parameter adjustment to satisfy the condition of the position limitation on the rectangular coordinate system which is received from the diagnosing computer 13.

(3) Condition Collation

The operation command for the servo gain adjustment is collated with the condition of the position limitation in a condition collating section 236. In the case in which the operation command for the servo gain adjustment is the angle command of each joint, it can be converted into a position on a task coordinate system and can be collated with the condition of the position limitation by using an arithmetic expression such as a sequential conversion. If an interference is not caused, the position is transmitted from a data transmitting section 25 to a data receiving section 14 of the diagnosing computer 13 through the commercial communication line 32 (③ in the drawing). The operation command is transferred to the controller 12 (④ in the drawing) and an operation for the servo gain adjustment is carried out.

If the interference is caused, an operation command is re-created and the re-creation is repeated until the interference is eliminated in the condition collating section 236.

In the same manner as in the second embodiment, subsequently, a control state quantity is stored and transferred, and a gain adjustment is executed to transfer a servo gain to the diagnosing computer 13, thereby confirming an operation.

Figure 9:
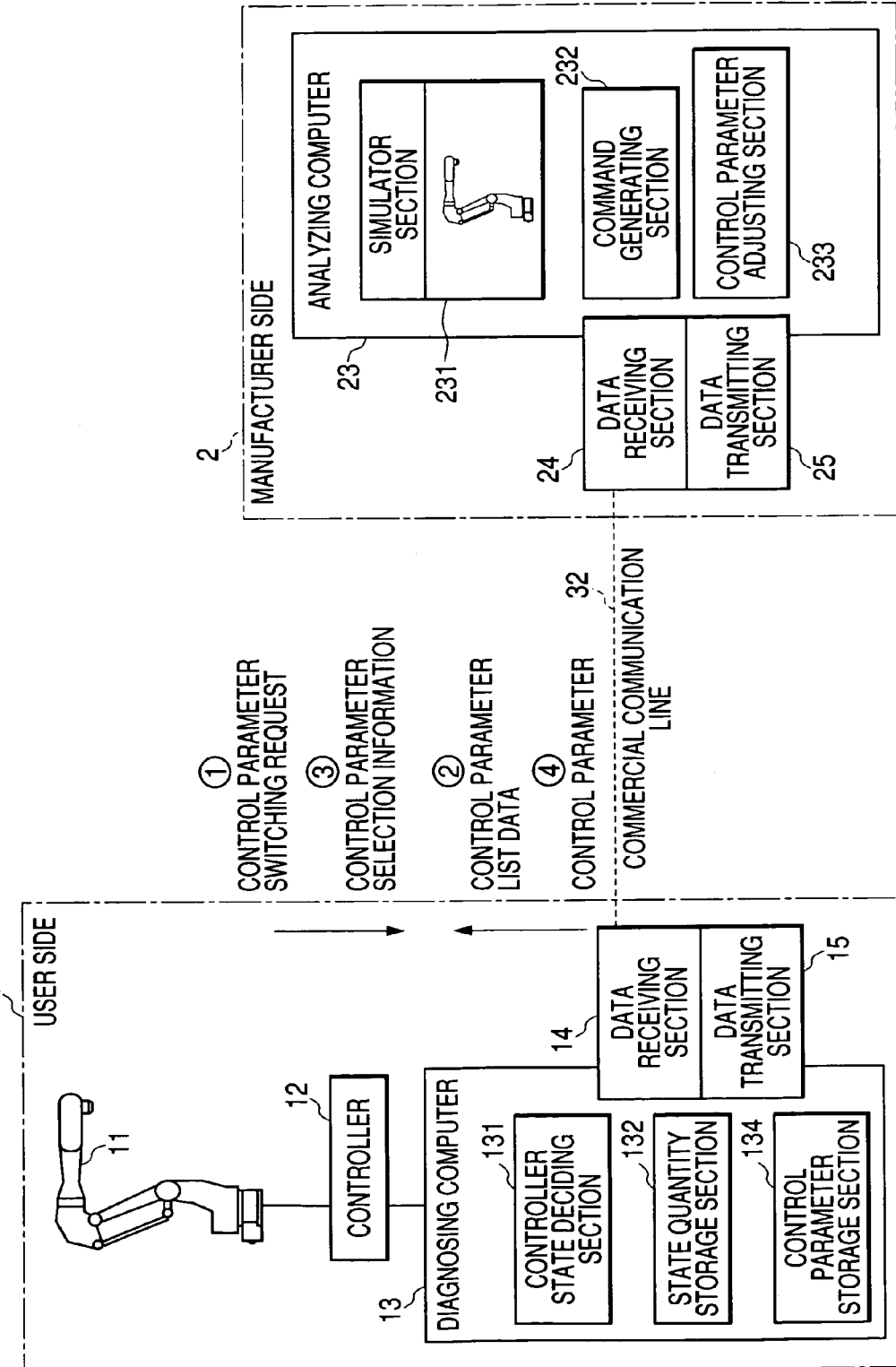
FIG. 9 is a diagram showing an eighth embodiment of the invention.

Next, an eighth embodiment of the invention will be described with reference to FIG. 9.

As described in the thirteenth aspect of the invention, a control parameter storage section 134 is provided in a diagnosing computer 13 on a user side 1 in such a manner that all control parameters (a servo gain and an inherent condition parameter in an application) used previously can be stored. Description will be given to an example of the case in which a control object is set to be a robot and the current use of the robot (for example, a welding use) is to be returned to the previous use (for example, a handling use) by a change in the line of a factory.

(1) Request for Switching of Parameter

In the case in which a robot 11 is to be changed from the welding use to the handling use, an operator on the user side 1 sends a request for switching a control parameter to the diagnosing computer 13 through a controller 12 (① in the drawing).

(2) Parameter List

When the request for switching a control parameter is sent to the control parameter storage section 134 provided in the diagnosing computer 13 according to the eighth embodiment, a data list related to the handling use is created from data on a control parameter registered until now in the control parameter storage section 134 or list data created and stored are transferred to the controller 12 (② in the drawing)

(3) Selection of Parameter

The operator selects one of the data corresponding to a desired handling work from the list data transferred to the controller 12. Control parameter selection information is transferred to the control parameter storage section 134 of the diagnosing computer 13 (③ in the drawing).

(4) Transfer of Control Parameter

When the control parameter selection information is transmitted to the control parameter storage section 134, the data on the control parameter selected from the data list related to the handling use are transferred to the controller 12 (④ in the drawing).

Also in the case in which the control object is returned into an original state by changing the line of a factory, thus, it is not necessary to newly readjust the control parameter by using the analyzing computer, resulting in a reduction in a time.

Next, a ninth embodiment of the invention will be described with reference to FIG. 10.

As described in the fourteenth aspect of the invention, a simulator section 135 is provided in a diagnosing computer 13 in such a manner that an operator can confirm the motion of a control object by the simulator section 135 before a control parameter (a servo gain or an inherent condition parameter in an application) used in a previous use is used for the control object. In the same manner as in the eighth embodiment, description will be given to an example of the case in which the current use of a robot (for example, a welding use) is to be returned to a previous use (for example, a handling use).

(1) Request for Switching of Parameter

In the case in which a robot 11 is to be changed from the welding use to the handling use, an operator on a user side 1 sends a request for switching a control parameter to the diagnosing computer 13 through a controller 12 (①  in the drawing).

(2) Parameter List

When the request for switching a control parameter is sent to a control parameter storage section 134 provided in the diagnosing computer 13, a data list related to the handling use is created from data on a control parameter registered until now in the control parameter storage section 134 or list data created and stored are transferred to the controller 12 (② in the drawing).

(3) Selection of Parameter

The operator selects one of the data corresponding to a desired handling work from the list data transferred to the controller 12. In the case in which the operator wants to confirm the motion of the robot using a selected control parameter, a simulator confirmation instruction is issued by the controller 12. The control parameter selection information and the simulator confirmation instruction are transferred to the control parameter storage section 134 of the diagnosing computer 13 (③ in the drawing).

(4) Confirmation of Parameter

When the control parameter selection information and the simulator confirmation instruction are sent to the control parameter storage section 134, data on a control parameter selected from a data list related to the handling use are transferred to the simulator section 135 (④ in the drawing) and a simulation using the same model as the robot used currently on the simulator section is executed. The operator decides whether the selected control parameter is correct based on the simulation.

(5) Transfer of Control Parameter

When the operator inputs a confirmation OK to the simulator section 135, a signal of the confirmation OK is transferred from the simulator section 135 to the control parameter storage section 134 (⑤ in the drawing) and the data on the control parameter selected from the data list related to the handling use are transferred to the controller 131 (⑥ in the drawing).

When the control object is returned into an original state by a change in the line of a factory, thus, the control parameter is previously confirmed by the simulation so that the operator and the control object can be prevented from being damaged by the reckless run of the control object due to the control parameter selected by mistake.

As described above, according to the remote adjusting and diagnosing apparatus for a control object in accordance with the first, second and third aspects of the invention, the diagnosing computer 13 is connected to the control object and is connected to the analyzing computer 23 on the manufacturer side 2 in a remote place through the commercial line, and the control parameter of the control object is adjusted through the analyzing computer 23. Consequently, the adjustment to be conventionally carried out by the operator on the manufacturer side 2 going to the factory of the user side 1 can easily be performed by the analyzing computer 23 on the manufacturer side 2.

Moreover, it is possible to immediately take a countermeasure in response to a request for the maintenance and adjustment of the operator on the user side 1 without stopping the line of the factory.

According to the remote adjusting and diagnosing apparatus for a control object in accordance with the fourth aspect of the invention, the servo gain is adjusted when an environment is regulated, for example, the operator on the user side 1 attaches a load to the control object. Consequently, the servo gain previously adapted roughly at time of a shipment from a factory can be safely adjusted with high precision corresponding to the load.

According to the remote adjusting and diagnosing apparatus for a control object in accordance with the fifth aspect of the invention, when the application or the work of the control object is changed, the inherent condition parameter in the application is adjusted. Consequently, the operator on the manufacturer side 2 having know-how can set conditions, and a time can be considerably shortened and quality can be maintained and enhanced.

According to the remote adjusting and diagnosing apparatus for a control object in accordance with the sixth aspect of the invention, an adjustment requiring a large-sized measuring device can also be carried out by using the same control object as that of the user side 1 for the adjustment. Furthermore, it is possible to considerably reduce a time and labor without stopping the line of a factory.

According to the remote diagnosing apparatus for a control object in accordance with the seventh aspect of the invention, it is possible to easily carry out the adjustment through the analyzing computer 23 on the manufacturer side 2 by using the control object of the user side 1. Consequently, it is possible to perform the adjustment flexibly with high precision for the aging of the control object.

Moreover, the state quantity of the control object is stored in time series. Therefore, it is possible to guess a time of a failure from the stored data. Consequently, the failure can be prevented. More specifically, the line of a factory can be prevented from being stopped.

According to the remote diagnosing apparatus for a control object in accordance with the eighth aspect of the invention, the command generating section 232 of the analyzing computer 23 has the remote control function and the control object on the user side 1 which is used in a remote place is operated manually through the analyzing computer 23. Also in the case in which the control object is provided in a narrow environment and it is hard to automatically generate the operation command, therefore, it is possible to flexibly generate an operation command by manually carrying out the remote control of the control object. More specifically, even if the control object is provided in any environment, it can be adjusted rapidly and flexibly in a remote place so that a time and labor can be reduced remarkably.

According to the remote diagnosing apparatus for a control object in accordance with the ninth aspect of the invention, the data transmitting section 15 of the diagnosing computer 13 periodically transmits the state quantity of the control object to the analyzing computer 23 and transmits the state quantity of the control object also when the controller state deciding section 131 makes a decision of abnormality or a request for a transmission is given. Consequently, the analyzing computer can periodically monitor the control object used by the user side 1 and can grasp a characteristic by carrying out an analysis using a statistical method for each control object.

Thus, the characteristic for each control object can be grasped on the manufacturer side 2. Consequently, it is possible to prevent a performance from being deteriorated by the failure or aging of the control object used on the user side 1. Thus, a time, a labor and a cost required for a countermeasure against a failure can be reduced remarkably.

Even if abnormality is generated, moreover, the state quantity obtained immediately before the generation of the abnormality is stored in the analyzing computer 23. Therefore, the cause of the abnormality can easily be clarified by the analysis of the waveform of the state quantity on the manufacturer side 2. More specifically, the cause of the abnormality can be clarified rapidly. Consequently, a countermeasure can be quickly taken against a failure or a breakaway. Thus, a time, a labor and a cost can be more reduced as compared with the conventional art.

According to the remote adjusting and diagnosing apparatus for a control object in accordance with the tenth aspect of the invention, the state quantity of the control object on the user side 1 is successively transmitted to the analyzing computer 23 to estimate and decide a failure in a normal play-back operation. Consequently, it is possible to monitor the state of the control object on the user side 1, thereby preventing the failure.

According to the remote adjusting and diagnosing apparatus for a control object in accordance with the eleventh aspect of the invention, the condition of the position limitation of the control object in the rectangular coordinate system or the joint coordinate system set through the condition setting section 121 of the controller 12 by the user side 1 in a remote place is compared and collated with the operation command created by the command generating section 232 of the analyzing computer 23 in the condition collating section 133. If an interference is caused, the operation command interference signal and the condition of the position limitation set by the user side 1 are returned to the analyzing computer 23 to re-create the operation command. Therefore, the adjustment of the control parameter can be prohibited in a position which is previously decided to be dangerous by the user side 1. Thus, a safety can be more enhanced.

According to the remote adjusting and diagnosing apparatus for a control object in accordance with the twelfth aspect of the invention, when the operation command for a control parameter adjustment which is created by the command generating section 232 of the analyzing computer 23 is to be created, the interference with the condition of the position limitation of the user side 1 is checked. If the interference is caused, re-creation can be carried out. Therefore, it is possible to reduce a transfer between the diagnosing computer 13 and the analyzing computer 23, thereby shortening a time taken for adjusting the control parameter.

According to the remote adjusting and diagnosing apparatus for a control object in accordance with the thirteenth aspect of the invention, the control parameter adjusted previously can be stored in the diagnosing computer. Also in the case in which the control object is returned to an original use by a change in the line of a factory, therefore, it is possible to shorten a time without carrying out a readjustment using the analyzing computer.

According to the remote adjusting and diagnosing apparatus for a control object in accordance with the fourteenth aspect of the invention, a conformation can be made in the simulator section before the previous control parameter stored in the control parameter storage section of the diagnosing computer is actually used for the control object. Consequently, the safety can be enhanced.

INDUSTRIAL APPLICABILITY

The invention is useful for a remote adjusting and diagnosing apparatus for carrying out the adjustment, maintenance and diagnosis of a control object, for example, a robot, a servo motor or an NC device which is provided in a remote place.

What is claimed is:

1. A remote adjusting and diagnosing apparatus for a control object comprising a control object including a motor and a controller for controlling the control object,
wherein the apparatus has a diagnosing computer connected to the controller and acquiring a state quantity of the control object, an analyzing computer provided remotely from the control object and having means for adjusting a control parameter of the control object, and a communicating function of connecting the computers, and the state quantity is transmitted to the analyzing computer by the communicating function and a control parameter of the control object is obtained based on the state quantity, and the control parameter is transmitted to the controller through the diagnosing computer to control the control object
wherein the analyzing computer has a command generating section for creating an operation command for a control parameter adjustment of the control object, a data transmitting section for transmitting the operation command to the diagnosing computer, a data receiving section for receiving a state quantity of the control object from the diagnosing computer, a simulator section for reproducing an operation and a state by using a model of the control object from the state quantity of the control object in accordance with the operation command, and a control parameter adjusting section for adjusting a control parameter from a result obtained by the simulator section.

2. The remote adjusting and diagnosing apparatus for a control object according to claim 1, wherein the diagnosing computer has a state quantity storage section for storing the state quantity of the control object, a controller state deciding section for deciding a state of the controller, a data receiving section for receiving an operation command sent from the analyzing computer, and a data transmitting section for transmitting the state quantity of the control object to the analyzing computer.

3. The remote adjusting and diagnosing apparatus for a control object according to claim 1, wherein the control parameter is a servo gain.

4. The remote adjusting and diagnosing apparatus for a control object according to claim 1, wherein the control parameter is an inherent condition parameter in an application.

5. The remote adjusting and diagnosing apparatus for a control object according to claim 1, wherein the same control object as that of a remote place is used in place of the simulator section of the analyzing computer.

6. The remote adjusting and diagnosing apparatus for a control object according to claim 1, wherein the analyzing computer has a command generating section for creating an operation command of the control object, a data transmitting section for transmitting the operation command to the diagnosing computer, a data receiving section for receiving a state quantity of the control object from the diagnosing computer, a data storage section for selectively storing data to be transmitted by the data transmitting section and data received by the data receiving section, and a control parameter adjusting section for adjusting a control parameter of the control object.

7. The remote adjusting and diagnosing apparatus for a control object according to claim 6, wherein the command generating section of the analyzing computer has a remote control function and operates a control object used in a remote place.

8. The remote adjusting and diagnosing apparatus for a control object according to claim 1 or 6, wherein the data transmitting section of the diagnosing computer periodically transmits the state quantity of the control object to the analyzing computer and transmits the state quantity of the control object when the controller state deciding section makes a decision of abnormality and/or a request for a transmission is given.

9. The remote adjusting and diagnosing apparatus for a control object according to claim 1, wherein the analyzing computer has a failure diagnosing and predicting section for transmitting the operation command and the state quantity of the control object from the diagnosing computer to the analyzing computer and deciding and estimating presence of abnormality from the state quantity of the control object in a play-back operation of the control object.

10. The remote adjusting and diagnosing apparatus for a control object according to claim 1, wherein there are provided a condition setting section for setting a condition of a position limitation of the control object in a rectangular coordinate system or a joint coordinate system over the controller when the control parameter is to be adjusted, and a condition collating section for transferring the condition of the position limitation set by the condition setting section to the diagnosing computer and collating an interference of an operation command for the control parameter adjustment received from the analyzing computer in the diagnosing computer with the condition of the position limitation, and an operation command interference signal output from the condition collating section and the condition of the position limitation are transmitted from the data transmitting section to the analyzing computer when the interference is caused, and an operation signal for the control parameter adjustment is re-created based on the operation command interference signal and the condition of the position limitation in the command generating section of the analyzing computer and is transmitted from the data transmitting section to the controller through the diagnosing computer.

11. The remote adjusting and diagnosing apparatus for a control object according to claim 1, wherein the analyzing computer includes the condition collating section, and the condition of the position limitation set by the condition setting section is transmitted to the analyzing computer to collate an interference of the operation command for the control parameter adjustment created by the command generating section of the analyzing computer with the condition of the position limitation in the condition collating section when the operation command for the control parameter adjustment is to be created in the command generating section of the analyzing computer, and the operation command for the control parameter adjustment is re-created and is transmitted from the data transmitting section to the controller through the diagnosing computer if the interference is caused.

12. The remote adjusting and diagnosing apparatus for a control object according to claim 1, wherein the diagnosing computer has a control parameter storage section capable of storing a plurality of control parameters.

13. The remote adjusting and diagnosing apparatus for a control object according to claim 12, wherein the diagnosing computer has a simulator section for reproducing an operation and a state from a state quantity of the control object based on an operation command by using a model of the control object.

* * * * *